United States Patent
Lee et al.

(10) Patent No.: US 11,477,802 B2
(45) Date of Patent: Oct. 18, 2022

(54) METHODS AND DEVICES FOR TRANSMITTING AND RECEIVING MODULATION SIGNALS IN WIRELESS COMMUNICATION SYSTEM

(71) Applicant: Samsung Electronics Co., Ltd., Suwon-si (KR)

(72) Inventors: Hyojin Lee, Suwon-si (KR); Junghyun Kim, Suwon-si (KR); Younsun Kim, Suwon-si (KR); Byungju Lee, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/048,556

(22) PCT Filed: Apr. 17, 2019

(86) PCT No.: PCT/KR2019/004626
§ 371 (c)(1),
(2) Date: Oct. 16, 2020

(87) PCT Pub. No.: WO2019/203564
PCT Pub. Date: Oct. 24, 2019

(65) Prior Publication Data
US 2021/0168829 A1 Jun. 3, 2021

(30) Foreign Application Priority Data
Apr. 20, 2018 (KR) .................. 10-2018-0046300

(51) Int. Cl.
*H04W 72/12* (2009.01)
*H04L 1/00* (2006.01)
*H04L 27/00* (2006.01)

(52) U.S. Cl.
CPC ......... *H04W 72/121* (2013.01); *H04L 1/0003* (2013.01); *H04L 1/0009* (2013.01);
(Continued)

(58) Field of Classification Search
None
See application file for complete search history.

(56) References Cited

U.S. PATENT DOCUMENTS 10,333,681 B2 6/2019 Kwak et al.
10,736,088 B2 8/2020 Ryu et al.
(Continued)

FOREIGN PATENT DOCUMENTS

KR 10-2010-0117644 A 11/2010
KR 10-2011-0053890 A 5/2011
(Continued)

OTHER PUBLICATIONS

International Search Report and Written Opinion of the International Searching Authority in connection with International Application No. PCT/KR2019/004626 dated Jul. 25, 2019, 10 pages.
(Continued)

*Primary Examiner* — Otis L Thompson, Jr.

(57) ABSTRACT

The disclosure relates to a method, performed by a base station, for transmitting and receiving modulation signals in a wireless communication system, the method including: transmitting group modulation configuration information to a user equipment, receiving feedback information about a group modulation scheme from the user equipment; and determining a modulation and coding scheme (MCS), in consideration of the feedback information.

15 Claims, 23 Drawing Sheets

(52) U.S. Cl.
CPC ........ *H04L 1/0026* (2013.01); *H04L 27/0008* (2013.01); *H04L 27/0012* (2013.01)

(56) References Cited

U.S. PATENT DOCUMENTS

| | | | |
|---|---|---|---|
| 11,350,450 B2* | 5/2022 | Xu | ................ H04W 72/14 |
| 2009/0197608 A1 | 8/2009 | Chin et al. | |
| 2010/0118800 A1* | 5/2010 | Kim | ............ H04W 72/042 |
| | | | 370/329 |
| 2011/0116568 A1* | 5/2011 | Oh | ............ H04L 25/4917 |
| | | | 375/295 |
| 2011/0194419 A1* | 8/2011 | Lee | .............. H04H 20/423 |
| | | | 370/242 |
| 2012/0082126 A1* | 4/2012 | Kim | .............. H04L 1/1812 |
| | | | 370/329 |
| 2012/0320837 A1 | 12/2012 | Kim et al. | |
| 2013/0215813 A1 | 8/2013 | Kotecha et al. | |
| 2013/0336246 A1* | 12/2013 | Yuk | .......... H04W 72/0406 |
| | | | 370/329 |
| 2015/0271794 A1 | 9/2015 | Kang et al. | |
| 2015/0358089 A1* | 12/2015 | Beckman | ............... H04B 7/024 |
| | | | 370/329 |
| 2016/0049999 A1 | 2/2016 | Taherzadeh Boroujeni et al. | |
| 2016/0218822 A1* | 7/2016 | Meng | ............... H04L 1/0027 |
| 2017/0366325 A1 | 12/2017 | Kwak et al. | |
| 2020/0022117 A1* | 1/2020 | Dong | ............. H04W 72/0453 |
| 2020/0235867 A1 | 7/2020 | Choi et al. | |
| 2020/0275284 A1 | 8/2020 | Choi et al. | |
| 2021/0168829 A1* | 6/2021 | Lee | .................. H04L 5/0053 |
| 2021/0258743 A1* | 8/2021 | Boban | ................... H04W 4/46 |

FOREIGN PATENT DOCUMENTS

| | | | |
|---|---|---|---|
| KR | 10-2015-0111819 A | | 10/2015 |
| KR | 10-2017-0141932 A | | 12/2017 |
| KR | 10-2018-0008567 A | | 1/2018 |
| KR | 10-2018-0013660 A | | 2/2018 |
| KR | 10-2018-0018350 A | | 2/2018 |
| WO | 2017178635 A1 | | 10/2017 |

OTHER PUBLICATIONS

Supplementary European Search Report dated Apr. 14, 2021 in connection with European Application No. 19789000.7, 10 pages.
Forney, et al., "Multidimensional Constellations—Part I: Introduction, Figures of Merit, and Generalized Cross Constellations," IEEE Journal on Selected Areas in Communications, vol. 7, No. 6, Aug. 1989, 16 pages.
Huawei, et al., "Applying Multi-Dimensional Modulation to Non-Orthogonal Multiple Access," R1-162163, 3GPP TSG RAN WG1 Meeting #84bis, Busan, Korea, Apr. 11-15, 2016, 5 pages.
Notice of Non-Final Rejection dated Feb. 16, 2022, in connection with Korean Application No. 10-2018-0046300, 13 pages.

* cited by examiner

FIG. 16

| CQI index | # of bits per group | Code rate x 1024 | efficiency |
|---|---|---|---|
| 0 | | out of range | |
| 1 | 3 | 144 | 0.2109 |
| 2 | 3 | 252 | 0.3691 |
| 3 | 3 | 380 | 0.5566 |
| 4 | 4 | 406 | 0.7930 |
| 5 | 4 | 553 | 1.0801 |
| 6 | 4 | 735 | 1.4355 |
| 7 | 8 | 484 | 1.8906 |
| 8 | 8 | 594 | 2.3203 |
| 9 | 8 | 723 | 2.8242 |
| 10 | 8 | 879 | 3.4336 |
| 11 | 16 | 531 | 4.1484 |
| 12 | 16 | 616 | 4.8125 |
| 13 | 16 | 701 | 5.4766 |
| 14 | 16 | 774 | 6.0469 |
| 15 | 16 | 831 | 6.4922 |

CQI table for GM size 2

| CQI index | # of bits per group | Code rate x 1024 | efficiency |
|---|---|---|---|
| 0 | | out of range | |
| 1 | 4 | 170 | 0.2214 |
| 2 | 4 | 298 | 0.3880 |
| 3 | 4 | 449 | 0.5846 |
| 4 | 6 | 426 | 0.8320 |
| 5 | 6 | 581 | 1.1348 |
| 6 | 6 | 772 | 1.5078 |
| 7 | 12 | 508 | 1.9844 |
| 8 | 12 | 624 | 2.4375 |
| 9 | 12 | 759 | 2.9648 |
| 10 | 12 | 923 | 3.6055 |
| 11 | 24 | 558 | 4.3594 |
| 12 | 24 | 647 | 5.0547 |
| 13 | 24 | 736 | 5.7500 |
| 14 | 24 | 813 | 6.3516 |
| 15 | 24 | 873 | 6.8203 |

CQI table for GM size 3

FIG. 17

| CQI index | modulation | Code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.377 |
| 4 | QPSK | 308 | 0.6016 |
| 5 | QPSK | 449 | 0.877 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Default CQI table

FIG. 20

| MCS index $I_{MCS}$ | #of bits per group | Target code Rate×[1024] R | Spectral efficiency |
|---|---|---|---|
| 0 | 3 | 252 | 0.3691 |
| 1 | 3 | 312 | 0.4570 |
| 2 | 3 | 380 | 0.5566 |
| 3 | 3 | 445 | 0.6519 |
| 4 | 4 | 406 | 0.7930 |
| 5 | 4 | 475 | 0.9277 |
| 6 | 4 | 553 | 1.0801 |
| 7 | 4 | 627 | 1.2246 |
| 8 | 4 | 735 | 1.4355 |
| 9 | 4 | 846 | 1.6523 |
| 10 | 8 | 484 | 1.8906 |
| 11 | 8 | 538 | 2.1016 |
| 12 | 8 | 594 | 2.3203 |
| 13 | 8 | 662 | 2.5859 |
| 14 | 8 | 723 | 2.8242 |
| 15 | 8 | 800 | 3.1250 |
| 16 | 8 | 879 | 3.4336 |
| 17 | 8 | 972 | 3.7969 |
| 18 | 16 | 531 | 4.1484 |
| 19 | 16 | 570 | 4.4531 |
| 20 | 16 | 616 | 4.8125 |
| 21 | 16 | 660 | 5.1563 |
| 22 | 16 | 701 | 5.4766 |
| 23 | 16 | 735 | 5.7422 |
| 24 | 16 | 774 | 6.0469 |
| 25 | 16 | 805 | 6.2891 |
| 26 | 16 | 831 | 6.4922 |
| 27 | 16 | 850 | 6.6406 |
| 28 | 3 | reserved | |
| 29 | 4 | reserved | |
| 30 | 8 | reserved | |
| 31 | 16 | reserved | |

MCS table for GM size 2

| MCS index $I_{MCS}$ | #of bits per group | Target code Rate×[1024] R | Spectral efficiency |
|---|---|---|---|
| 0 | 4 | 298 | 0.3880 |
| 1 | 4 | 360 | 0.4688 |
| 2 | 4 | 449 | 0.5846 |
| 3 | 4 | 525 | 0.6836 |
| 4 | 6 | 426 | 0.8320 |
| 5 | 6 | 504 | 0.9844 |
| 6 | 6 | 581 | 1.1348 |
| 7 | 6 | 679 | 1.3262 |
| 8 | 6 | 772 | 1.5078 |
| 9 | 6 | 887 | 1.7324 |
| 10 | 12 | 499 | 1.9492 |
| 11 | 12 | 560 | 2.1875 |
| 12 | 12 | 624 | 2.4375 |
| 13 | 12 | 690 | 2.6953 |
| 14 | 12 | 759 | 2.9648 |
| 15 | 12 | 830 | 3.2422 |
| 16 | 24 | 460 | 3.5938 |
| 17 | 24 | 505 | 3.9453 |
| 18 | 24 | 554 | 4.3281 |
| 19 | 24 | 600 | 4.6875 |
| 20 | 24 | 647 | 5.0547 |
| 21 | 24 | 690 | 5.3906 |
| 22 | 24 | 736 | 5.7500 |
| 23 | 24 | 773 | 6.0391 |
| 24 | 24 | 813 | 6.3516 |
| 25 | 24 | 846 | 6.6094 |
| 26 | 24 | 873 | 6.8203 |
| 27 | 24 | 896 | 7.0000 |
| 28 | 4 | reserved | |
| 29 | 6 | reserved | |
| 30 | 12 | reserved | |
| 31 | 24 | reserved | |

MCS table for GM size 3

FIG. 21

| MCS index $I_{MCS}$ | Modulation Order $Q_m$ | Target code Rate×[1024] R | Spectral efficiency |
|---|---|---|---|
| 0 | 2 | 120 | 0.2344 |
| 1 | 2 | 157 | 0.3066 |
| 2 | 2 | 193 | 0.377 |
| 3 | 2 | 251 | 0.4902 |
| 4 | 2 | 308 | 0.6016 |
| 5 | 2 | 379 | 0.7402 |
| 6 | 2 | 449 | 0.877 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.332 |
| 28 | 6 | 948 | 5.5547 |
| 29 | 2 | reserved | |
| 30 | 4 | reserved | |
| 31 | 6 | reserved | |

MCS table for GM size 3

METHODS AND DEVICES FOR TRANSMITTING AND RECEIVING MODULATION SIGNALS IN WIRELESS COMMUNICATION SYSTEM

CROSS-REFERENCE TO RELATED APPLICATIONS

This application is a 371 National Stage of International Application No. PCT/KR2019/004626, filed Apr. 17, 2019, which claims priority to Korean Patent Application No. 10-2018-0046300, filed Apr. 20, 2018, the disclosures of which are herein incorporated by reference in their entirety.

BACKGROUND

1. Field

The disclosure relates to methods and devices for transmitting and receiving signals containing information in a wireless communication system.

2. Description of Related Art

To meet the increasing demand for wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long-term evolution (post-LTE)' systems. To achieve high data transmission rates, implementation of 5G communication systems in an ultra-high frequency (mmWave) band (e.g., a 60-GHz band) is being considered. To reduce path loss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks, for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and reception interference cancellation have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network whereby humans create and consume information to the Internet of things (IoT) whereby distributed elements such as objects exchange information with each other to process the information. Internet-of-Everything (IoE) technology is also emerging, in which big data processing technology is combined with IoT technology via a cloud server or the like. To implement the IoT, various technological elements such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In an IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies such as sensor networks, M2M communication, MTC, or the like are being implemented by using 5G communication technologies such as beamforming, MIMO, array antennas, or the like. Application of a cloud RAN as the above-described big data processing technology may be an example of convergence of 5G communication technology and IoT technology.

As a variety of services can be provided owing to the development of mobile communication systems as described above, a method of effectively providing such services is required.

SUMMARY

Embodiments set forth herein are directed to providing a device and method for effectively providing a service in a mobile communication system.

Embodiments set forth herein provide a method and device for transmitting and receiving modulation signals in a wireless communication system.

According to embodiments set forth herein, services can be effectively provided in a mobile communication system.

BRIEF DESCRIPTION OF THE DRAWINGS

FIG. 16 is a diagram illustrating a channel quality indicator (CQI) table in a group modulation mode, according to an embodiment.

FIG. 17 is a diagram illustrating a CQI table in a default mode, according to an embodiment.

FIG. 20 is a diagram illustrating an MCS table in the group modulation mode, according to an embodiment.

FIG. 21 is a diagram illustrating an MCS table in the default mode, according to an embodiment.

DETAILED DESCRIPTION

Figure 1:
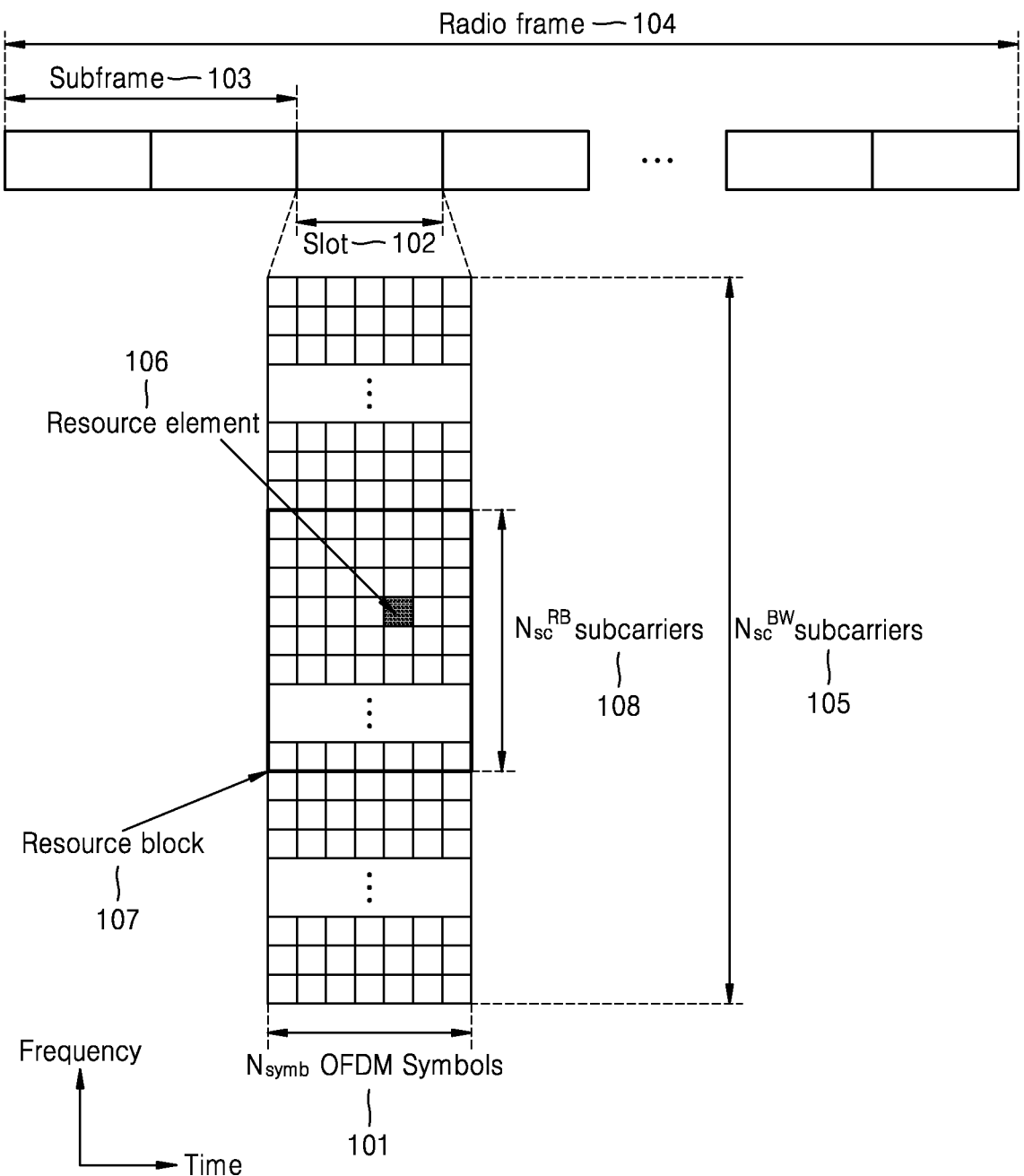
FIG. 1 is a diagram illustrating a basic structure of a time-frequency domain, which is a radio resource domain, in an LTE, 5G, or similar system, according to an embodiment.

In some embodiments, a method, performed by a base station, for transmitting and receiving modulation signals in a wireless communication system includes transmitting group modulation configuration information to a user equipment (UE), receiving feedback information on a group modulation scheme from the UE; and determining a modulation and coding scheme (MCS), in consideration of the feedback information.

In some embodiments, the group modulation configuration information may include at least one of information about whether the group modulation scheme is to be used in the base station, a group size available for group modulation, or the number of bits per group for group modulation.

In some embodiments, the feedback information may include a channel quality indicator (CQI) index, and the CQI index may be selected according to at least one of: a group size for group modulation which is determined based on at least one of channel state information or information about capabilities of the UE; the number of bits per group; or a code rate.

In some embodiments, the method may further include transmitting information about the determined MCS to the UE, and the determining of the MCS may include determining whether to use the group modulation scheme in the UE, based on the feedback information, and based on a result of the determining, determining an MCS to be used in the UE.

In some embodiments, the information about the MCS may include information about the group modulation scheme to be used in the UE, and the information about the group modulation scheme to be used in the UE may include at least one of information about whether the group modulation scheme is to be used in the UE, a group size for group modulation, the number of bits per group, or a code rate.

In some embodiments, the transmitting of the information about the determined MCS to the UE may include transmitting the information about the determined MCS to the UE by using a physical downlink control channel (PDCCH).

In some embodiments, the transmitting of the group modulation configuration information to the UE may include transmitting the group modulation configuration information to the UE by at least one of higher layer signaling or radio resource control (RRC) signaling.

In some embodiments, an operating method of a user equipment (UE) to transmit and receive modulation signals in a wireless communication system includes: receiving group modulation configuration information from a base station; transmitting feedback information about a group modulation scheme to the base station; and receiving, from the base station, information about a modulation and coding scheme (MCS) determined in consideration of the feedback information.

In some embodiments, the feedback information may include a channel quality indicator (CQI) index, and the CQI index may be selected according to at least one of: a group size for group modulation which is determined based on at least one of channel state information or information about capabilities of the UE; the number of bits per group; or a code rate.

In some embodiments, the group modulation configuration information may include at least one of information about whether the group modulation scheme is to be used in the base station, a group size available for group modulation, or the number of bits per group for group modulation.

In some embodiments, the MCS may be determined by the base station, and determined according to whether the group modulation scheme is to be used in the UE, based on the feedback information.

In some embodiments, information about the MCS may include information about the group modulation scheme to be used in the UE.

In some embodiments, the information about the group modulation scheme to be used in the UE may include at least one of information about whether the group modulation scheme is to be used in the UE, a group size for group modulation, the number of bits per group, or a code rate.

In some embodiments, the receiving of the information about the MCS may include receiving the information about the MCS from the base station by using a physical downlink control channel (PDCCH).

In some embodiments, the receiving of the group modulation configuration information may include receiving the group modulation configuration information from the base station by at least one of higher layer signaling or radio resource control (RRC) signaling.

In some embodiments, a base station for transmitting and receiving modulation signals in a wireless communication system includes a transceiver; at least one memory storing a program for transmitting and receiving modulation signals; and at least one processor configured to execute the program to control to: transmit group modulation configuration information to a user equipment (UE), receive feedback information about a group modulation scheme from the UE, and determine a modulation and coding scheme (MCS) in consideration of the feedback information.

In some embodiments, a user equipment (UE) for transmitting and receiving modulation signals in a wireless communication system includes a transceiver; at least one memory storing a program for transmitting and receiving modulation signals; and at least one processor configured to execute the program to control to: receive group modulation configuration information from a base station; transmit feedback information about a group modulation scheme to the base station; and receive, from the base station, information about a modulation and coding scheme (MCS) determined in consideration of the feedback information.

Hereinafter, embodiments of the disclosure will be described in detail with reference to the accompanying drawings.

When embodiments of the disclosure are described herein, a description of techniques which are well known in the technical field to which the disclosure pertains and are not directly related to the disclosure will be omitted. This is to more clearly convey the gist of the disclosure by omitting unnecessary description.

For the same reason, some components are exaggerated, omitted, or schematically illustrated in the accompanying drawings. The size of each component does not entirely reflect the actual size thereof. The same reference numbers are allocated to the same or corresponding elements in each drawing.

Advantages and features of the disclosure and methods of achieving them will be apparent from embodiments of the disclosure described in detail, in conjunction with the accompanying drawings. However, the disclosure is not limited to the embodiments thereof below and may be embodied in many different forms. Rather, these embodiments are provided so that this disclosure will be thorough and complete and will fully convey the concept of the disclosure to those of ordinary skill in the art. The disclosure should be defined by the scope of the claims. The same reference numerals refer to the same components throughout the specification.

In this case, it will be understood that each block of process flowcharts and combinations of the flowcharts may be performed by computer program instructions. The computer program instructions may be installed in a processor of a general-purpose computer, special-purpose computer, or other programmable data processing equipment, so that means to perform functions described in blocks of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in a block (or blocks) of each flowchart, may be produced by the instructions stored in the computer usable or readable memory. Because the computer program instructions may be stored in a computer or other programmable data processing equipment, the functions of the blocks of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes one or more executable instructions for executing specified logical function(s). It should be noted that in some alternative embodiments, the functions described in the blocks may be performed in an order different from that described herein. For example, two blocks illustrated consecutively may be performed substantially simultaneously or performed in a reverse order according to functions corresponding thereto in some cases.

In this case, the term "unit" used in embodiments set forth herein refers to software or a hardware component, such as a field programmable gate array (FPGA) or an application-specific integrated circuit (ASIC), which performs certain functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in "units" may be combined to a smaller number of components and "units" or may be divided into sub-components and "sub-units". In addition, the components and "units" may be implemented to execute one or more CPUs in a device or a secure multimedia card. In an embodiment, a "unit" may include one or more processors.

Hereinafter, an operating principle of the disclosure will be described in detail with reference to the accompanying drawings. In the following description of the disclosure, well-known functions or constructions are not described in detail when it is determined that they would obscure the subject matter of the disclosure due to unnecessary detail. Terms to be described below should be defined in consideration of functions of the disclosure but may be variable depending on the intention of users or operators, practices, or the like. Therefore, the terms should be defined based on the whole context of the disclosure. Hereinafter, a base station refers to a subject that allocates a resource to a terminal, and may include at least one of a gNode B, an eNode B, a node B, a base station (BS), a radio access unit, a base station controller, or a node in a network. Examples of a terminal may include a UE, a mobile station (MS), a cellular phone, a smartphone, a computer, a multimedia system capable of performing a communication function, or the like. However, embodiments are not limited to the above examples.

The disclosure is applicable to intelligent services (e.g., smart home, smart buildings, smart cities, smart cars or connected cars, health care, digital education, retail business, security, safety-related services, etc.) based on 5G communication technology and IoT-related technology.

In the following description, terms referring to broadcast information, terms referring to control information, terms related to communication coverage, terms referring to changes of states (e.g., an event), terms referring to network entities, terms referring to messages, terms referring to components of a device, etc. are merely provided as examples for convenience of explanation. Accordingly, the disclosure is not limited to the terms described below and other terms having equivalent technical meanings may be used.

In the following description, some of terms and names defined in the 3$^{rd}$ generation partnership project long-term evolution (3GPP LTE) standards may be used for convenience of explanation. However, the disclosure is not limited by the terms and names and is equally applicable to systems conforming to other standards.

Wireless communication systems are evolving from an initial stage of voice-oriented services to broadband wireless communication systems providing high-speed and high-quality packet data services, e.g., communication standards such as 3GPP High-Speed Packet Access (HSPA), Long-Term Evolution (LTE) or Evolved Universal Terrestrial Radio Access (E-UTRA), LTE-Advanced (LTE-A), LTE-Pro, 3GPP2 High-Rate Packet Data (HRPD), Ultra Mobile Broadband (UMB), and IEEE 802.16e, and the like.

In an LTE system which is a representative example of a broadband wireless communication system, an Orthogonal Frequency Division Multiplexing (OFDM) scheme is employed in a downlink (DL) and a Single Carrier-Frequency Division Multiple Access (SC-FDMA) scheme is employed in an uplink (UL). The UL refers to a radio link through which a UE (or an MS) transmits data or a control signal to an eNode B (or a base station (BS), and the DL refers to a radio link through which the base station transmits data or a control signal to the UE. In a multiple access method as described above, time-frequency resources for carrying data or control information are allocated and operated in units of users such that the time-frequency resources do not overlap each other, that is, orthogonality is established, thereby identifying data or control information from each user.

A future communication system after LTE, that is, a 5G communication system should be capable of freely reflecting various requirements from users, service providers, and the like and thus should support services satisfying various requirements at the same time. Examples of services that may be considered for 5G communication systems include Enhanced Mobile BroadBand (eMBB), Massive Machine Type Communication (mMTC), Ultra-Reliability Low-Latency Communication (URLLC), etc.

In some embodiments, eMBB may be aimed to provide more improved data transmission rates than those supported by existing LTE, LTE-A or LTE-Pro. For example, in 5G communication systems, eMBB should be capable of providing a peak data rate of 20 Gbps in a downlink and a peak data rate of 10 Gbps in an uplink in terms of a base station. In addition, 5G communication systems should provide not only a peak data rate but also an actual increased user-perceived data rate of a UE. To satisfy such requirements, in 5G communication systems, improvement of various transmission/reception technologies, including more advanced multi-input multi-output (MIMO) transmission technology, may be required. Signals are transmitted using up to a transmission bandwidth of 20 MHz in a 2 GHz band currently used in LTE, whereas 5G communication systems use a frequency bandwidth greater than 20 MHz in a frequency band of 3 to 6 GHz or 6 GHz or higher, thus satisfying a data transmission rate required for 5G communication systems.

At the same time, mMTC has been considered to support application services such as the Internet of Things (IoT) in 5G communication systems. In order to efficiently provide the Internet of Things, for mMTC, supporting of connection of large-scale UEs within a cell, improvement of coverage of UEs, improved battery times, reduction in costs of UEs, and the like may be required. The Internet of Things provides communication functions when employed in various types of sensors or various types of devices and thus should support a large number of UEs (e.g., 1,000,000 UEs/km2) within a cell. Because a UE supporting mMTC is likely to be located in a dead spot, e.g., a basement of a building, which is not covered by a cell according to features of a service, coverage wider than those of other services provided by 5G communication systems may be required. A UE supporting mMTC should be a low-cost UE and it is difficult to frequently replace a battery thereof, and thus, a very long battery life time, e.g., 10 to 15 years, may be required.

Lastly, URLLC may be used for cellular-based wireless communication services for a mission-critical purpose, e.g., remote control of robots or machinery, industrial automation, services for unmanned aerial vehicles, remote health care, emergency alerts, and the like. Therefore, communication provided by URLLC may need to provide very low latency (ultra-low latency) and very high reliability (super reliability). For example, a service supporting URLLC should satisfy an air interface latency of less than 0.5 milliseconds, and at the same time, may require a packet error rate of $10^{-5}$ or less. Therefore, for a service supporting URLLC, a 5G system should provide a transmission time interval (TTI) less than those of other services, and at the same time, design particulars for allocating a wide resource in a frequency band may be required to secure reliability of a communication link.

Three services considered in the 5G communication systems described above, i.e., eMBB, URLLC, and mMTC, may be multiplexed and transmitted in one system. In this case, different transmission and reception techniques and parameters may be used for services to satisfy different requirements of the services. However, mMTC, URLLC, and eMBB described above are only examples of different services and the types of services to which the disclosure is applicable are not limited thereto.

Although embodiments of the disclosure will be described below with respect to an LTE, LTE-A, LTE Pro or 5G (or NR) system as an example, embodiments of the disclosure are applicable to other communication systems having similar technical backgrounds or channel types. Embodiments of the disclosure may be applied to other communication systems by making some modifications thereto by those of ordinary skill in the art without greatly departing from the scope of the disclosure.

Hereinafter, frame structures of LTE, LTE-A, and 5G systems will be described in more detail with reference to the drawings.

FIG. 1 is a diagram illustrating a basic structure of a time-frequency domain, which is a radio resource domain, in an LTE, 5G, or similar system according to an embodiment. In FIG. 1, the horizontal axis represents a time domain and the vertical axis represents a frequency domain. In the time domain, a minimum transmission unit may be an OFDM symbol, $N_{symb}$ OFDM symbols 101 may form one slot 102, and two slots may form one subframe 103. A length of the slot 102 may be 0.5 ms, and a length of the subframe 103 may be 1.0 ms. A radio frame 104 is a time domain unit composed of ten subframes. In the frequency domain, a minimum transmission unit may be a subcarrier, and an entire system transmission bandwidth is composed of a total of $N_{sc}^{BW}$ subcarriers 105. A basic resource unit in the time-frequency domain may be a resource element (RE) 106 and be represented by an OFDM symbol index and a subcarrier index. A resource block ((RB) or a physical resource block (PRB)) 107 may be defined by $N_{symb}$ consecutive OFDM symbols 101 in the time domain and by $N_{sc}^{RB}$ consecutive subcarriers 108 in the frequency domain.

Therefore, one RB 107 includes ($N_{symb} \times N_{sc}^{RB}$) REs 106. Generally, a minimum data transmission unit may be an RB unit. Generally, in an LTE system, $N_{symb}=7$ and $N_{sc}^{RB}=12$, and $N_{sc}^{BW}$ and $N_{sc}^{RB}$ may be proportional to a bandwidth of a system transmission band. However, these specific values may be variably controlled depending on the system.

Next, downlink control information (DCI) in LTE and LTE-A systems will be described in detail.

In some embodiments, in the LTE system, scheduling information for downlink data or uplink data may be transmitted from a base station to a UE through DCI. In some embodiments, the DCI may define various formats, and a DCI format determined according to whether the DCI is scheduling information for uplink data or scheduling information for downlink data, whether the DCI is compact DCI which is a small amount of control information, whether spatial multiplexing using a multi-antenna array is used, whether the DCI is DCI for power control, or the like may be applied and operated. For example, DCI format 1, which is scheduling control information for downlink data, is configured to include at least the following control information:

- resource allocation type 0/1 flag: indicates whether a resource allocation method is type 0 or type 1. In the type 0 method, resources are allocated in units of resource block groups (RBGs) by applying a bitmap method. In the LTE system, a basic scheduling unit is a resource block (RB) represented by time and frequency domain resources, and the RBG includes a plurality of RBs and is used as a basic scheduling unit in the type 0 method. In the type 1 method, a certain RB is allocated within an RBG.
- resource block assignment: indicates an RB allocated for data transmission. A resource to be expressed is determined according to a system bandwidth and a resource allocation method.
- modulation and coding scheme (MCS): indicates a modulation scheme used for data transmission and the size of a transport block which is data to be transmitted.
- HARQ process number: notifies a process number of a hybrid automatic repeat request (HARQ).
- new data indicator: indicates initial HARQ transmission or retransmission.
- redundancy version: indicates a redundancy version of the HARQ.
- transmission power control (TPC) command for a physical uplink control channel (PUCCH): indicates a TPC command for a PUCCH which is an uplink control channel.

In some embodiments, DCI may be channel-coded and modulated and transmitted by using a physical downlink control channel (PDCCH).

In some embodiments, cyclic redundancy check (CRC) may be attached to a payload of a DCI message, and the CRC is scrambled by a radio network temporary identifier (RNTI) corresponding to the identity of a UE. Different RNTIs may be used according to a purpose of the DCI message, e.g., transmission of UE-specific data, a power control command, a random access response, or the like. That is, the RNTI is not explicitly transmitted but is transmitted while being included in a CRC calculation process. Upon receiving the DCI message transmitted in the PDCCH, the UE may check the CRC by using an RNTI allocated thereto and identifies that this message is transmitted to the UE when a result of checking the CRC reveals correct.

Figure 2:
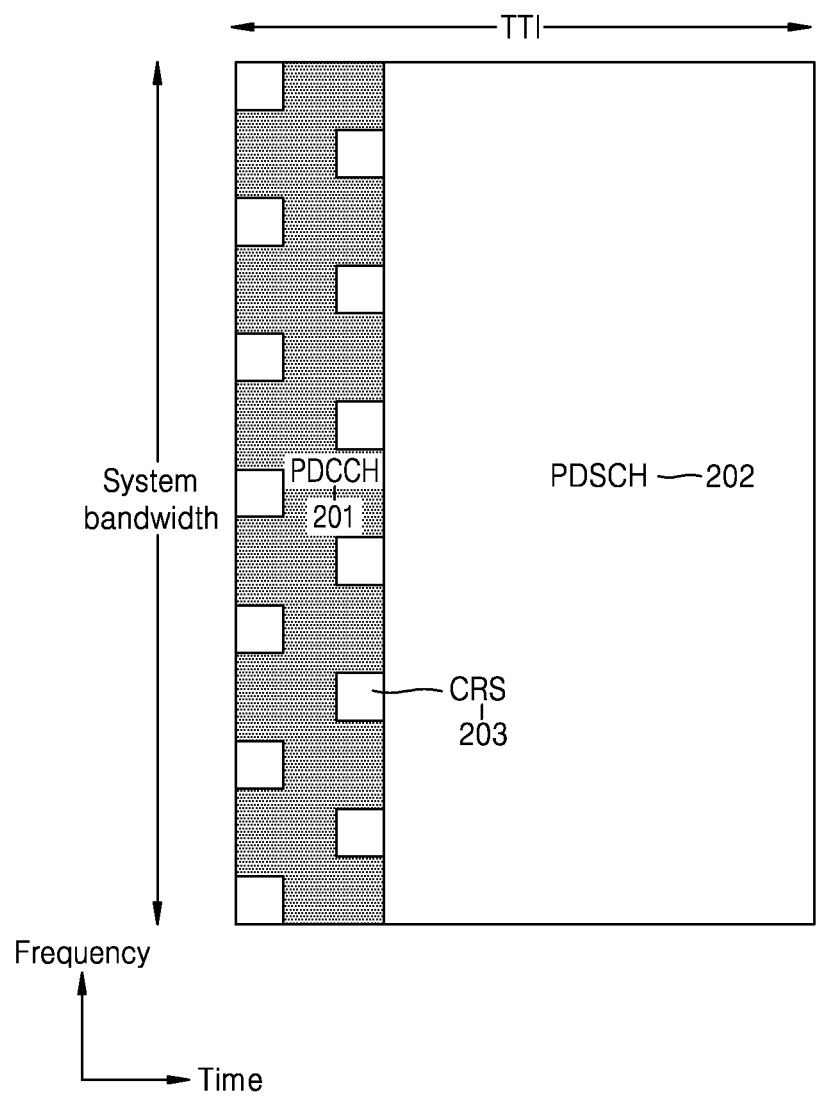
FIG. 2 is a diagram illustrating a downlink control channel in an LTE, 5G, or similar system, according to an embodiment.

FIG. 2 is a diagram illustrating a downlink control channel in an LTE, 5G, or similar system according to an embodiment.

FIG. 2 illustrates a PDCCH 201, which is a downlink physical channel in which DCI of LTE is transmitted. Referring to FIG. 2, the PDCCH 201 may be time-multiplexed with a PDSCH 202, which is a data transmission channel, and transmitted over an entire system bandwidth. A region of the PDCCH 201 may be represented by the number of OFDM symbols and indicated, to a UE, as a Control Format Indicator (CFI) transmitted by using a Physical Control Format Indicator Channel (PCFICH). The PDCCH 201 may be allocated to an OFDM symbol in the front of a subframe, so that the UE may be capable of decoding downlink scheduling allocation on as soon as possible, thereby reducing a delay in decoding of a Downlink Shared Channel (DL-SCH), i.e., an overall downlink transmission delay. One PDCCH may carry one DCI message and multiple UEs may be simultaneously scheduled in a downlink and an uplink, and therefore, multiple PDCCHs may be simultaneously transmitted in each cell. A cell-specific reference signal (CRS) 203 may be used as a reference signal for decoding the PDCCH 201. The CRS 203 may be transmitted for each subframe over an entire band, and scrambling and resource mapping may be changed according to cell identity (ID). The CRS 203 is a reference signal commonly used by all UEs and thus UE-specific beamforming cannot be used. Accordingly, a MIMO transmission method for a PDCCH of LTE may be limited to open-loop transmission diversity. However, embodiments are not limited to the above examples. The number of CRS ports may be implicitly known to the UE through decoding of a physical broadcast channel (PBCH).

In some embodiments, resource allocation for the PDCCH 201 may be based on a control-channel element (CCE), and one CCE may correspond to nine resource element groups (REGs) and include a total of thirty six resource elements (REs). The number of CCEs required for a certain PDCCH 201 may be 1, 2, 4, or 8 and may vary according to a channel coding rate of a payload of a DCI message. The different numbers of CCEs may be used to implement link adaptation of the PDCCH 201. The UE should detect a signal in a state in which information about the PDCCH 201 is not known, and for blind decoding, a search space representing a set of CCEs is defined in LTE. The search space includes a plurality of sets at an aggregation level (AL) of each CCE, and may not be explicitly signaled but be implicitly defined using a function according to UE identity and a subframe number. In each subframe, the UE may decode the PDCCH 201 with respect to all possible resource candidates achievable from CCEs in a configured search space and process information declared to be valid for the UE through CRC verification.

In some embodiments, the search space may be classified into a terminal-specific search space and a common search space. UEs belonging to a certain group or all UEs may search for a common search space of the PDCCH 201 to receive cell-common control information, such as dynamic scheduling or paging messages, related to system information. For example, scheduling allocation information of a DL-SCH for transmission of a System Information Block (SIB)-1 including cell operator information may be received by searching for the common search space of the PDCCH 201.

In some embodiments, in LTE, an entire PDCCH region includes a set of CCEs in a logical region and a search space including a set of CCEs exists. Search spaces may be divided into a common search space and a UE-specific search space, and a search space for an LTE PDCCH may be defined as follows.

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by
$L \{(Y_k + m') \bmod \lfloor N_{CCE,k} / L \rfloor\} + i$
where $Y_k$ is defined below, $i = 0, L, L - 1$. For the common search space $m' = m$. For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then $m' = m$, where $m = 0, L, M^{(L)} - 1$.
$M^{(L)}$ is the number of PDCCH candidates to monitor in the given search space.
Note that the carrier indicator field value is the same as ServCellIndex
For the common search spaces, $Y_k$ is set to 0 for the two aggregation levels $L = 4$ and $L = 8$.
For the UE-specific search space $S_k^{(L)}$ at aggregation level $L$, the variable $Y_k$ is defined by
$Y_k = (A \cdot Y_{k-1}) \bmod D$
where $Y_{-1} = n_{RNTI} \neq 0$, $A = 39827$, $D = 65537$ and $k = \lfloor n_s/2 \rfloor$, $n_s$ is the slot number within a radio frame.
The RNTI value used for $n_{RNTI}$ is defined in subclause 7.1 in downlink and subclause 8 in uplink.

According to the above-described definition of the search space for the PDCCH, the UE-specific search space may not be explicitly signaled but be implicitly defined using a function according to UE identity and a subframe number. In other words, the UE-specific search space may vary according to the subframe number and thus may change with time, thereby solving a problem that a certain UE cannot use a search space due to other UEs (blocking problem). When all CCEs searched for by a UE have already been used by other UEs scheduled in the same subframe and thus the UE cannot be scheduled in this subframe, such a problem may be prevented from occurring in a subsequent subframe because the search space changes with time. For example, even when UE-specific search spaces of a first UE and a second UE partially overlap in a certain subframe, the UE-specific search spaces change in units of subframes and thus it is expected that a degree of the overlapping thereof in a subsequent subframe may change.

In some embodiments, according to the above-described definition of the search space for the PDCCH, a common search space is defined as a set of predetermined CCEs because the PDCCH should be received by a certain group of UEs or all UEs. In other words, the common search space may not change according to UE identity, a subframe number, or the like. Although the common search space exists for transmission of various system messages, the common search space is available for transmission of control information of individual UEs. Therefore, the common search space is available as a solution to a phenomenon that scheduling of the UE is not possible due to an insufficient resource available in the UE-specific search space.

In some embodiments, the search space is a set of candidate control channels consisting of CCEs to be decoded by a UE at a given aggregation level, and there are various aggregation levels at which one, two, four or eight CCEs form a bundle. Thus, the UE may have multiple search spaces. The number of PDCCH candidates to be monitored by a UE in a search space defined according to an aggregation level in an LTE PDCCH may be defined by a table below.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |

TABLE 1-continued

| Type | Search space $S_k^{(L)}$ | | Number of PDCCH candidates $M^{(L)}$ |
|---|---|---|---|
| | Aggregation level L | Size [in CCEs] | |
| Common | 4 | 16 | 4 |
| | 8 | 16 | 2 |

According to Table 1, in the case of the UE-specific search space, aggregation levels $\{1, 2, 4, 8\}$ may be supported and $\{6, 6, 2, 2\}$ PDCCH candidate groups may be respectively provided therefor. In the case of a common search space 302, the aggregation levels $\{4, 8\}$ may be supported and $\{4, 2\}$ PDCCH candidate groups may be respectively provided therefor. The reason why the common search space supports only the $\{4, 8\}$ aggregation levels is to improve coverage characteristics because in general, system messages should reach an edge of each cell.

In some embodiments, DCI transmitted to the common search space may be defined only for certain DCI formats such as DCI formats 0/1A/3/3A/1C corresponding to a purpose such as power control for system messages or UE groups. DCI formats with spatial multiplexing may not be supported in the common search space. However, embodiments are not limited to the above examples. A downlink DCI format to be decoded in the UE-specific search space may vary according to a transmission mode configured for a corresponding UE. Because the transmission mode is configured by Radio Resource Control (RRC) signaling, an exact subframe number for whether the configuration of the transmission mode is effective for the corresponding UE is not specified. Therefore, the UE may be operated to always perform decoding with respect to the DCI format 1A regardless of a transmission mode so as to prevent loss of communication.

A method of transmitting and receiving a downlink control channel and downlink control information in LTE and LTE-A and a search space have been described above, and a downlink control channel in a 5G communication system currently being discussed will be described in more detail below.

Figure 3:
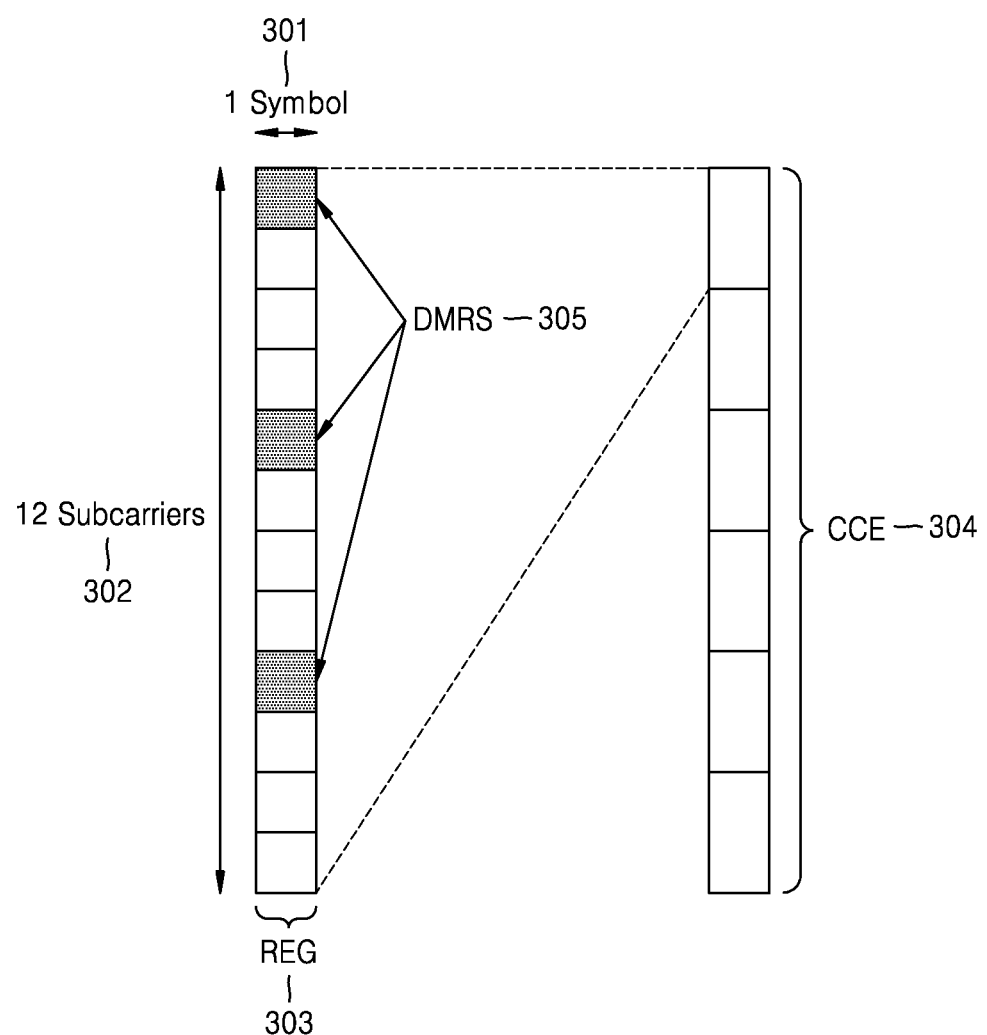
FIG. 3 is a diagram illustrating transmission resources of a downlink control channel in an LTE, 5G or similar system, according to an embodiment.

FIG. 3 is a diagram illustrating transmission resources of a downlink control channel in an LTE, 5G or similar system according to an embodiment.

Referring to FIG. 3, an REG 303 which is a basic unit of time and frequency resources constituting a control channel is configured with one OFDM symbol 301 on a time axis and twelve subcarriers 302, i.e., one RB, on a frequency axis. It is assumed that a basic unit of the time axis is one OFDM symbol 301 when a basic unit of the control channel is configured, so that a data channel and the control channel may be time-multiplexed in one subframe. A user's processing time may be reduced by positioning the control channel ahead of the data channel, thus making it easy to meet latency time requirements. Frequency multiplexing between the control channel and the data channel may be more efficiently performed by configuring a basic unit of the frequency axis of the control channel to one RB 302.

Control channel regions having various sizes may be configured through concatenation with the REG 303 illustrated in FIG. 3. For example, when a basic unit to which a downlink control channel is allocated in 5G is a CCE 304, resource set duration of two symbols, and the control resource set #2 402 is configured to a control resource set duration of one symbol.

The above-described control resource sets in 5G may be configured for a UE by a base station by higher-layer signaling (e.g., system information, a master information block (MIB), or radio resource control (RRC) signaling). The configuration of the control resource set for the UE refers to proving the UE with information, such as positions of the control resource sets, a subband, allocation of resources to the control resource sets, a control resource set duration, and the like. For example, the information may include that shown in Table 2 below.

TABLE 2

CONFIGURATION INFORMATION 1: RB ALLOCATION INFORMATION ON FREQUENCY AXIS
CONFIGURATION INFORMATION 2: CONTROL RESOURCE SET START SYMBOL
CONFIGURATION INFORMATION 3: CONTROL RESOURCE SET DURATION
CONFIGURATION INFORMATION 4: REG BUNDLING SIZE (2, 3 OR 6)
CONFIGURATION INFORMATION 5: TRANSMISSION MODE (INTERLEAVED TRANSMISSION METHOD DR NON-INTERLEAVED TRANSMISSION METHOD)
CONFIGURATION INFORMATION 6: DMRS CONFIGURATION INFORMATION (PRECODER GRANULARITY)
CONFIGURATION INFORMATION 7: SEARCH SPACE TYPE (COMMON SEARCH SPACE,GROUP-COMMON SEARCH SPACE, UE-SPECIFIC SEARCH SPACE)
CONFIGURATION INFORMATION 8: DCI FORMAT TO BE MONITORED IN CORRESPONDING CONTROL RESOURCE SET
Others one CCE 304 may be configured with a plurality of REGs 303. For example, in the case of the REG 303 of FIG. 3, when the REG 303 includes twelve REs and one CCE 304 includes six REGs 303, one CCE 304 may include seventy two REs. When a downlink control resource set is configured, this region may be configured with a plurality of CCEs 304, and a certain downlink control channel may be transmitted by being mapped to one or more CCEs 304 according to an aggregation level AL in a control resource set. The CCEs 304 in the control resource set are identified using numbers. In this case, the numbers may be allocated according to a logical mapping method.

The basic unit of the downlink control channel of FIG. 3, i.e., the REG 303, may include both REs to which DCI is mapped and a region to which a demodulation reference signal (DMRS) 305, which is a reference signal for decoding the DCI, is mapped. As illustrated in FIG. 3, the DMRS 305 may be transmitted in three REs in one REG 303. For reference, because the DMRS 305 is transmitted using precoding such as a control signal mapped in the REG 303, a UE is capable of decoding control information even when there is no information about precoding applied by a base station.

Figure 4:
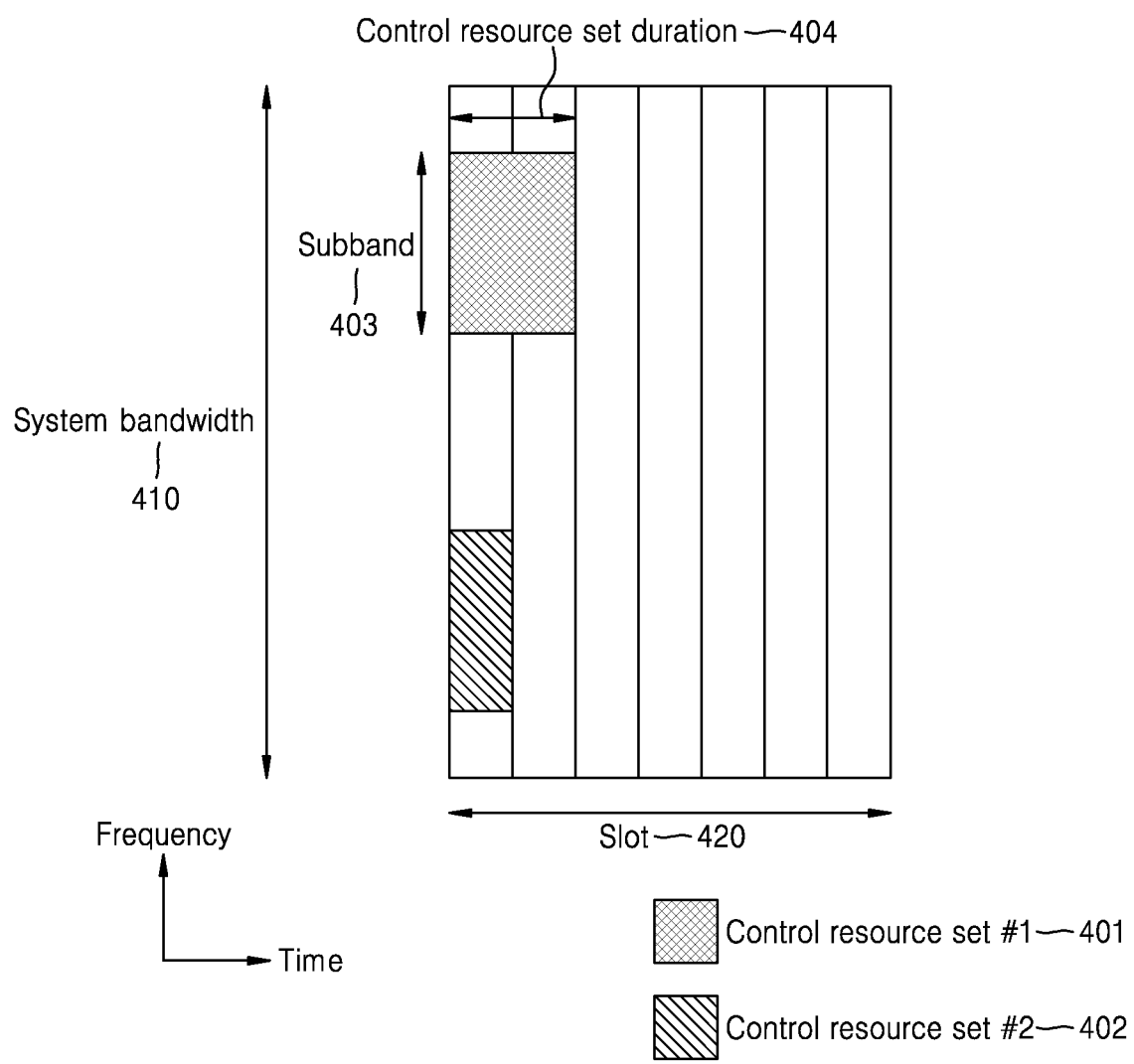
FIG. 4 is a diagram illustrating a configuration of a control resource set in an LTE, 5G, or similar system, according to an embodiment.

FIG. 4 is a diagram illustrating a configuration of a control resource set in an LTE, 5G, or similar system according to an embodiment. FIG. 4 illustrates examples of a control resource set (CORESET) in which a downlink control channel is transmitted in a 5G wireless communication system, e.g., two control resource sets, i.e., a control resource set #1 and a control resource set #2, which are configured in a system bandwidth 410 on a frequency axis and one slot 420 (it is assumed in the example of FIG. 4 that one slot includes seven OFDM symbols) on a time axis. The control resource sets 401 and 402 may be configured to correspond to a certain subband 403 of the entire system bandwidth 410 on the frequency axis. One or more OFDM symbols may be configured on the time axis, and defined as a control resource set duration 404. In the example of FIG. 4, the control resource set #1 401 is configured to a control However, embodiments are not limited to the above examples, and various information necessary to transmit a downlink control channel may be configured for the UE, as well as the configuration information of Table 2.

Next, downlink control information (DCI) in 5G will be described in detail.

In the 5G system, scheduling information of uplink data (physical uplink shared channel (PUSCH)) or downlink data (physical downlink shared channel (PDSCH)) may be transmitted from a base station to a UE through the DCI. The UE may monitor a fallback DCI format and a non-fallback DCI format with respect to the PUSCH or the PDSCH. The fallback DCI format may include a fixed field between the base station and the UE, and the non-fallback DCI format may include a configurable field.

In some embodiments, fallback DCI for scheduling the PUSCH may include information shown in Table 3 below.

TABLE 3

Identifier for DCI formats - [1] bit
Frequency domain resource assignment -
[⌈log$_2$(N$_{RB}^{DL,BWP}$ (N$_{RB}^{DL,BWP}$ + 1)/2)⌉] bits
Time domain resource assignment - X bits
Frequency hopping flag - 1 bit.
Modulation and coding scheme - [5] bits
New data indicator - 1 bit
Redundancy version - [2] bits
HARQ process number - [4] bits
TPC command for scheduled PUSCH - [2] bits
UL/SUL indicator - 0 or 1 bit In some embodiments, a non-fallback DCI for scheduling the PUSCH may include information shown in Table 4 below.

TABLE 4

Carrier indicator - 0 or 3 bits
Identifier for DCI formats - [1] bits

TABLE 4-continued

Bandwidth part indicator – 0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2) \rceil$ bits
Time domain resource assignment –1, 2, 3, or 4 bits
VRB-to-PRB mapping – 0 or 1 bit, only for resource allocation type 1.
    0 bit if only resource allocation type 0 is configured;
    1 bit otherwise.
Frequency hopping flag – 0 or 1 bit, only for resource allocation type 1.
    0 bit if only resource allocation type 0 is configured;
    1 bit otherwise.
Modulation and coding scheme – 5 bits
New data indicator – 1 bit
Redundancy version – 2 bits as defined in section x.x of [6, TS38.214]
HARQ process number – 4 bits
1st downlink assignment index – 1 or 2 bits
    1 bit for semi-static HARQ-ACK codebook;
    2 bits for dynamic HARQ-ACK codebook with single HARQ-ACK codebook.
2nd downlink assignment index – 0 or 2 bits
    2 bits for dynamic HARQ-ACK codebook with two HARQ-ACK sub-codebooks;
    0 bit otherwise.
TPC command for scheduled PUSCH – 2 bits – SRS resource indicator – $\left\lceil \log_2\left(\sum_{k=1}^{L_{max}} \binom{N_{SRS}}{k}\right) \right\rceil$ or $\lceil \log_2(N_{SRS}) \rceil$ bits $\left\lceil \log_2\left(\sum_{k=1}^{L_{max}} \binom{N_{SRS}}{k}\right) \right\rceil$ bits for non–codebook based PUSCH transmission;

$\lceil \log_2(N_{SRS}) \rceil$ bits for codebook based PUSCH transmission.
Precoding information and number of layers –up to 6 bits
Antenna ports – up to 5 bits
SRS request – 2 bits
CSI request – 0, 1, 2, 3, 4, 5, or 6 bits
CBG transmission information – 0, 2, 4, 6, or 8 bits
PTRS-DMRS association – 2 bits.
beta_offset indicator – 2 bits
DMRS sequence initialization – 0 or 1 bit
UL/SUL indicator – 0 or 1 bit In some embodiments, fallback DCI for scheduling the PDSCH may include information shown in Table 5 below.

TABLE 5

Identifier for DCI formats - [1] bit
Frequency domain resource assignment -
$\lceil \log_2 (N_{RB}^{DL,BWP} (N_{RB}^{DL,BWP} + 1)/ 2) \rceil$ bits
Time domain resource assignment - X bits
VRB-to-PRB mapping - 1 bit.
Modulation and coding scheme - [5] bits
New data indicator - 1 bit
Redundancy version - [2] bits
HARQ process number - [4] bits
Downlink assignment index - 2 bits
TPC command for scheduled PUCCH - [2] bits
PUCCH resource indicator - [2] bits
PDSCH-to-HARQ feedback timing indicator - [3] bits In some embodiments, non-fallback DCI for scheduling the PDSCH may include information shown in Table 6 below.

TABLE 6

Carrier indicator - 0 or 3 bits
Identifier for DCI formats - [1] bits
Bandwidth part indicator - 0, 1 or 2 bits
Frequency domain resource assignment TABLE 6-continued For resource allocation type 0, $\lceil N_{RB}^{DL,BWP} / P \rceil$ bits
    For resource allocation type 1,
    $\lceil \log_2 (N_{RB}^{DL,BWP} (N_{RB}^{DL,BWP} + 1) / 2) \rceil$ bits
Time domain resource assignment -1, 2, 3, or 4 bits
VRB-to-PRB mapping - 0 or 1 bit, only for resource allocation type 1,
    0 bit if only resource allocation type 0 is configured;
    1 bit otherwise.
PRB bundling size indicator - 1 bit
Rate matching indicator - 0, 1, 2 bits
ZP CSI-RS trigger - X bits
For transport block 1:
    Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
HARQ process number - 4 bits
Downlink assignment index - 0 or 4 bits
TPC command for scheduled PUCCH - 2 bits
PUCCH resource indicator
PDSCH-to-HARQ_feedback timing indicator - 3 bits
Antenna ports - up to 5 bits
Transmission configuration indication - 3 bits
SRS request - 2 bits
CBG transmission information - 0, 2, 4, 6, or 8 bits
CBG flushing out information - 0 or 1 bit
DMRS sequence initialization - 0 or 1 bit In some embodiments, the DCI may be channel-coded and modulated and transmitted by using a physical downlink control channel (PDCCH). Cyclic redundancy check (CRC) may be attached to a payload of a DCI message, and the CRC may be scrambled by a radio network temporary identifier (RNTI) corresponding to the identity of the UE. Different RNTIs may be used according to a purpose of the DCI message, e.g., transmission of UE-specific data, a power control command, a random access response, or the like. In some embodiments, the RNTI is not explicitly transmitted but is transmitted while being included in a CRC calculation process. Upon receiving the DCI message transmitted in the PDCCH, the UE may check the CRC by using an RNTI allocated thereto and identify that this message is transmitted thereto when a result of checking the CRC reveals correct.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI notifying a slot format indicator (SFI) may be scrambled by an SFI-RNTI. DCI notifying transmission power control (TPC) may be scrambled by a TPC-RNTI. DCI for scheduling a UE-specific PDSCH or PUSCH may be scrambled by a cell RNTI (C-RNTI).

Figure 5:
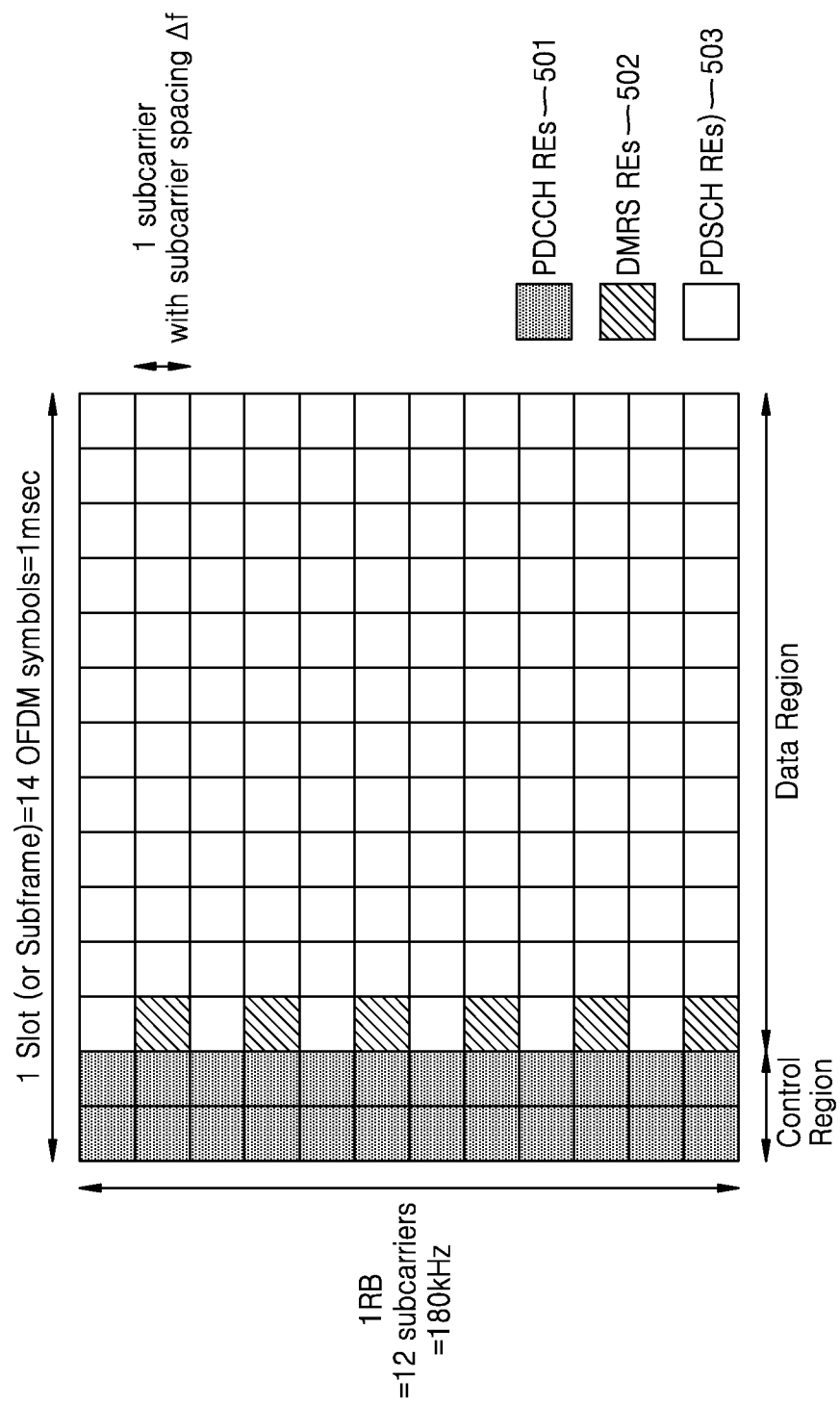
FIG. 5 is a diagram illustrating a configuration of a downlink resource block (RB) structure in an LTE, 5G, or similar system, according to an embodiment.

In some embodiments, when a certain UE is scheduled for a data channel, i.e., a PUSCH or a PDSCH, by using the PDCCH, data may be transmitted and received along with a DMRS in a scheduled resource domain. FIG. 5 illustrates an example in which a certain UE is configured to use fourteen OFDM symbols as one slot (or a subframe) in a downlink, a PDCCH is transmitted in two initial OFDM symbols, and a DMRS is transmitted in a third symbol. Referring to FIG. 5, in a certain RB for which a PDSCH is scheduled, the PDSCH may be transmitted, in which data is mapped to REs of a third symbol in which a DMRS is not transmitted and REs of a fourth symbol to a last symbol. A subcarrier spacing Δf illustrated in FIG. 5 may be 15 kHz in the case of an LTE/LTE-A system, and one of {15, 30, 60, 120, 240, 480} kHz may be used in the case of a 5G system.

In some embodiments, the base station may need to transmit a reference signal to measure a downlink channel state in a cellular system. In the case of the Long-Term Evolution Advanced (LTE-A) system of 3GPP, a UE may measure a channel state between a base station and the UE by using a CRS or a CSI-RS transmitted from the base station. The channel state should be measured in consideration of various factors, including the amount of interference in a downlink. The amount of interference in the downlink includes an interference signal, thermal noise and the like generated by an antenna belonging to an adjacent base station, and is important for the UE to identify a channel condition of the downlink. In some embodiments, when a base station with, a single transmission antenna transmits a signal to a single reception antenna of an UE, the UE should determine an energy per symbol to interference density ratio (Es/Io) by identifying, from a reference signal received from the base station, the amount of energy of each of symbols receivable in the downlink and the amount of interference to be simultaneously received in sections at which the symbols are received. The determined Es/Io may be converted into a data transmission rate or a value corresponding thereto and transmitted in the form of a channel quality indicator (CQI) to the base station, and may be used for the base station to determine a data transmission rate at which data is to be transmitted to the UE.

In some embodiments, in the case of LTE, LTE-A, 5G, or a similar system, the UE may feed back information about the channel state of the downlink to the base station so that this information may be used to schedule the downlink of the base station. That is, the UE measures a reference signal transmitted by the base station in the downlink and feeds back information extracted from the measured reference signal to the base station in the form defined in the LTE/LTE-A standard. As described above, information fed back by the UE in LTE/LTE-A may be referred to as channel state information, and the channel state information may include the following three pieces of information:

rank Indicator (RI): the number of spatial layers receivable by the UE according to a current channel state;

precoding matrix indicator (PMI): an indicator of a precoding matrix preferred by the UE according to the current channel state; and channel quality indicator (CQI): a maximum data rate at which data is to be received by the UE according to the current channel state.

In some embodiments, the CQI may be replaced with a signal-to-interference-plus-noise ratio (SINR) that may be used similarly to the maximum data rate, a maximum error correction code rate and modulation scheme, data efficiency per frequency, or the like.

In some embodiments, the RI, the PMI, and the CQI are related to one another. For example, a precoding matrix supported by LTE/LTE-A is defined differently for each rank. For example, a PMI X when the RI is 1 and a PMI X when the RI is 2 may be interpreted differently. When the UE determines the CQI, it is assumed that the PMI X that the UE has reported to the base station is applied to the base station. That is, when the UE reports RI_X, PMI_Y, and CQI_Z to the base station, it may be understood that the UE reports to the base station that the UE may receive data at a data rate corresponding to CQI_Z when the rank is set to RI_X and the PMI is set to PMI_Y. As described above, when the CQI is calculated, the UE may assume which transmission method is to be performed with respect to the base station so as to optimize performance when actual transmission is performed by the transmission method.

In some embodiments, the RI, the PMI, and the CQI, which are channel state information fed back by the UE in LTE/LTE-A, may be fed back in a periodic or aperiodic form. In order to aperiodically obtain channel state information of a certain UE, the base station may be configured to aperiodically perform feedback (or aperiodically report channel state information) using an aperiodic feedback indicator (or a channel state information request field or channel state information request information) included in downlink control information for the UE. When receiving an indicator configured to perform aperiodic feedback in an $n^{th}$ subframe, the UE may perform uplink transmission by including aperiodic feedback information (or channel state information) in data transmission in an $(n+k)^{th}$ subframe. k is a parameter defined in the 3GPP LTE Release 11 standard, may be 4 in frequency division duplexing (FDD), and may be as shown in Table 7 below in time division duplexing (TDD).

TABLE 7

| K for each subframe number n in TDD UL/DL configuration | | | | | | | | | | |
|---|---|---|---|---|---|---|---|---|---|---|
| TDD UL/DL | subframe number n | | | | | | | | | |
| Configuration | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In some embodiments, when aperiodic feedback is configured, feedback information (or channel state information) includes the RI, the PMI, and the CQI, and the RI and the PMI may be fed back according to a feedback configuration (or channel status report configuration).

Embodiments of the disclosure will be described in detail with reference to the accompanying drawings. Embodiments of the disclosure will be described below, for example, with respect to an LTE or LTE-A system but are applicable to other communication systems having a similar technical background or channel type. For example, embodiments of the disclosure are applicable to 5G mobile communication technologies (5G and New Radio (NR)) developed after LTE-A. Therefore, embodiments of the disclosure may be applied to other communication systems by making some modifications thereto by those of ordinary skill in the art without greatly departing from the scope of the disclosure.

Well-known functions or constructions related to explaining the disclosure are not described in detail when it is determined that they would obscure the subject matter of the disclosure due to unnecessary detail. Terms to be described below should be defined in consideration of functions of the disclosure but may be variable depending on the intention of users or operators, practices, or the like. Therefore, the terms should be defined based on the whole context of the disclosure.

In the disclosure, a method of grouping a plurality of REs and mapping them to one modulation symbol to transmit data, and demodulating the data by receiving a modulation symbol corresponding to a Resource Element Group (REG) is proposed. The proposed modulation scheme will be hereinafter referred to as group modulation (GM). The disclosure may include a method of grouping REs within an RB for group modulation, a method of configuring a CQI and an MCS for group modulation-based link adaptation, and a method of configuring a base station and a UE according to whether group modulation is to be used and a group modulation type to be used.

Figure 6:
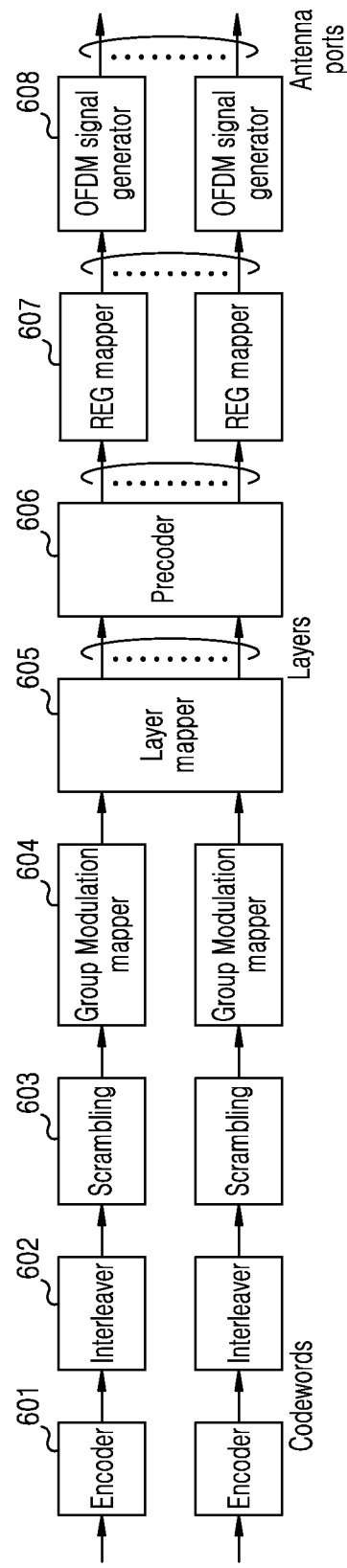
FIG. 6 is a block diagram illustrating a data transmission process in an LTE, 5G, or similar system, according to an embodiment.

FIG. 6 is a block diagram illustrating a data transmission process in LTE, 5G, or a similar system according to an embodiment. Bits input in the form of codewords through an encoder 601 in a downlink are scrambled (603) through an interleaver 602. A group modulation mapper 604 maps the scrambled bits to a complex modulation symbol, and a layer mapper 605 maps the complex modulation symbol to one or more transport layers. Next, a precoder 606 precodes the complex modulation symbol in each transmission channel of an antenna port. A REG mapper 607 maps a complex modulation symbol for each antenna port to an REG. Thereafter, an OFDM signal generator 608 performs Inverse Fast Fourier Transform (IFFT) to generate a complex time domain OFDM signal for each antenna. Complex time domain OFDM signals are transmitted through a multi-antenna port or a single antenna port.

Figure 7:
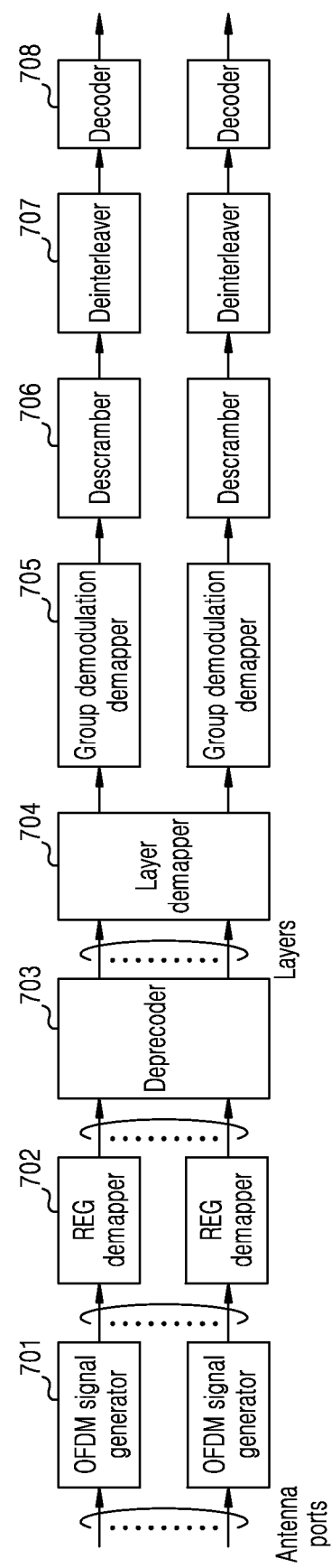
FIG. 7 is a block diagram illustrating a data reception process in an LTE, 5G, or similar system, according to an embodiment.

In some embodiments, when operated in a fallback mode according to a request from a base station or a UE, a default modulation mapper and a default RE mapper may be used instead of the group modulation mapper 604 and the REG mapper 607. The default modulation mapper and the default RE mapper may be the same as those used in existing LTE/LTE-A or 5G FIG. 7 is a block diagram illustrating a data reception process in LTE, 5G, or a similar system according to an embodiment. An OFDM signal receiver 701 performs Fast Fourier Transform (FFT) on OFDM signals received via a multi-antenna array or single antennas, and a REG demapper 702 performs demapping on a signal corresponding to an REG. A deprecoder 703 performs deprecoding on signals received by antenna ports, and a layer demapper 704 performs demapping on each codeword. A group demodulation demapper 705 performs demodulation on each layer, and a descrambler 706 performs descrambling on the demodulated signals. A deinterleaver 707 performs deinterleaving on descrambled signals in consideration of the number of layers for each codeword, and a decoder 708 decodes data according to an RI, ACK, and CQI information.

When operated in the fallback mode according to a request from a base station or a UE, a default RE demapper and a default demodulation mapper may be used instead of the REG demapper 702 and the group demodulation demapper 705. The default RE demapper and the default demodulation mapper may be the same as those used in existing LTE/LTE-A or 5G NR.

Figure 8:
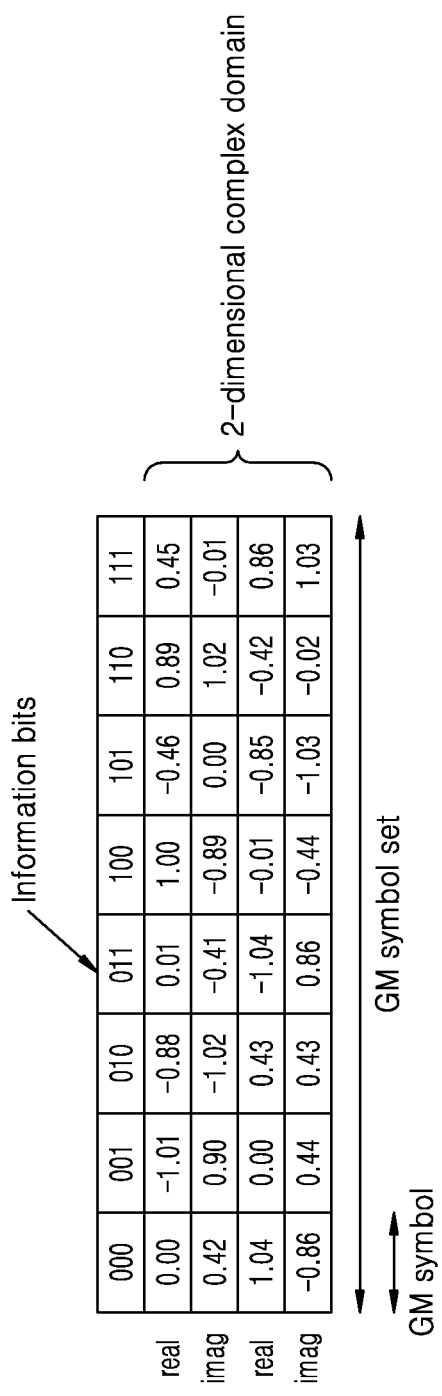
FIG. 8 illustrates a group modulation symbol according to an embodiment.

In some embodiments, one group modulation symbol may be represented by the number of pairs of real values and imaginary values corresponding to a group size or expressed with the number of complex values corresponding to the group size. The pairs of real values and imaginary values or the complex values may be referred to as group modulation sub-symbols. FIG. 8 illustrates examples of a group modulation symbol having a group size of 2 and corresponding to 3-bit data and a group modulation symbol having a group size of 3 and corresponding to 4-bit data. For example, to transmit 3-bit data 011, two complex values 0.01−0.41i and −1.04+0.86i may be mapped to a group modulation symbol and transmitted. A value of the group modulation symbol is not fixed to a value according to an embodiment and may be changed to a value optimized for the performance in the system.

Figure 9:
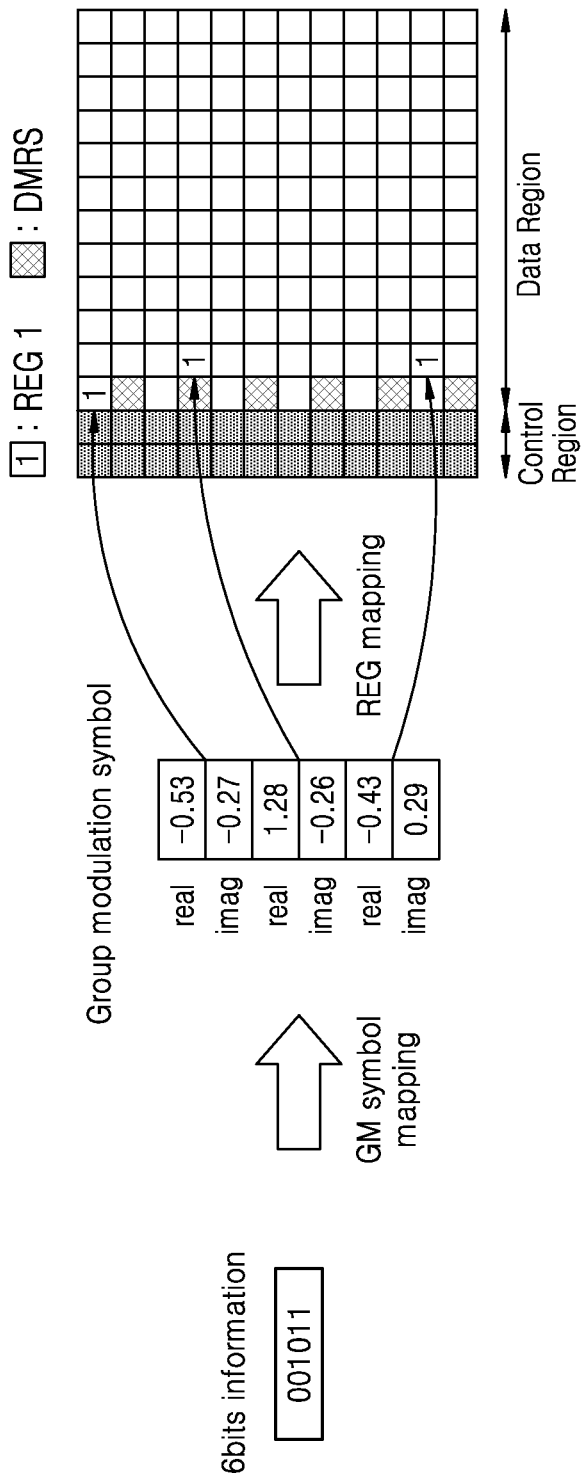
FIG. 9 is a diagram illustrating a process of mapping a group modulation symbol to a resource element (RE) group, according to an embodiment.

FIG. 9 illustrates an example of a process of mapping a binary data sequence to a group modulation symbol and mapping the group modulation symbol to an RE group. 6-bit data 001011 may be mapped to a predefined group modulation symbol having values of −0.53−0.27i, 1.28−0.26i, and −0.43+0.29i. In some embodiments, −0.53−0.27i, 1.28−0.26i, and −0.43+0.29i may be values of group modulation sub-symbols. Because the group modulation symbol of FIG. 9 has a group size of 3, three REs are mapped as one group to a data region of an RB.

FIGS. 10 to 13 illustrate a method of grouping REs within a data region of an RB for group modulation. REs belonging to the same group are indicated with the same number. For example, when a group size is 2, twelve REs are grouped into six groups. In some embodiments, when the number of REs in the data region is not a multiple of the group size, information may not be transmitted to REs corresponding to a remainder obtained by dividing the number of REs in the data region by the group size or may be modulated by a default modulation scheme not using group modulation and transmitted thereto. However, embodiments are not limited to the above examples. The default modulation scheme may be defined in advance in the system and fixedly used or may be used variably in consideration of a channel state.

In some embodiments, basically, a method of configuring adjacent REs as a group or a method of configuring REs distributed as far as possible from the time axis or the frequency axis to minimize noise and interference concentrated in a certain time period or at a certain frequency and having a bad influence may be used as the method of grouping REs. Alternatively, an interleaver may be used to randomly map REs to each group. However, embodiments are not limited to the above examples and the method of grouping REs is not limited.

Figure 10:
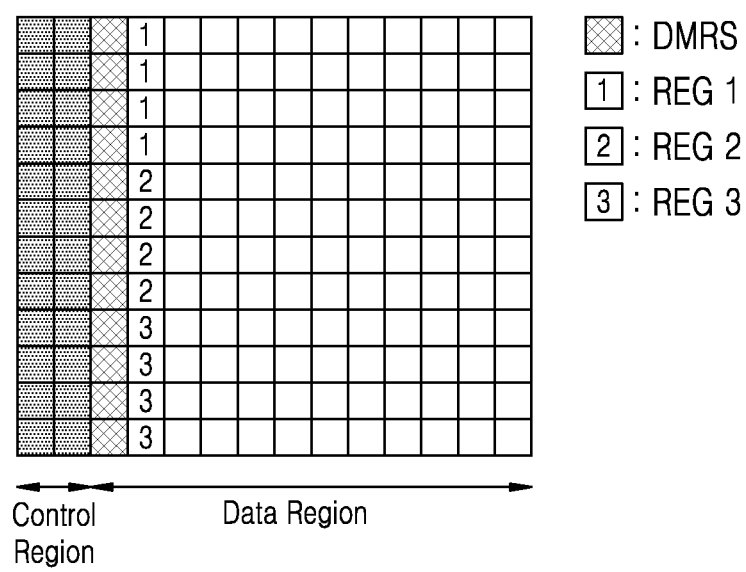
FIG. 10 is a diagram illustrating a method of configuring adjacent REs as one group when a group size is 4, according to an embodiment.
Figure 11:
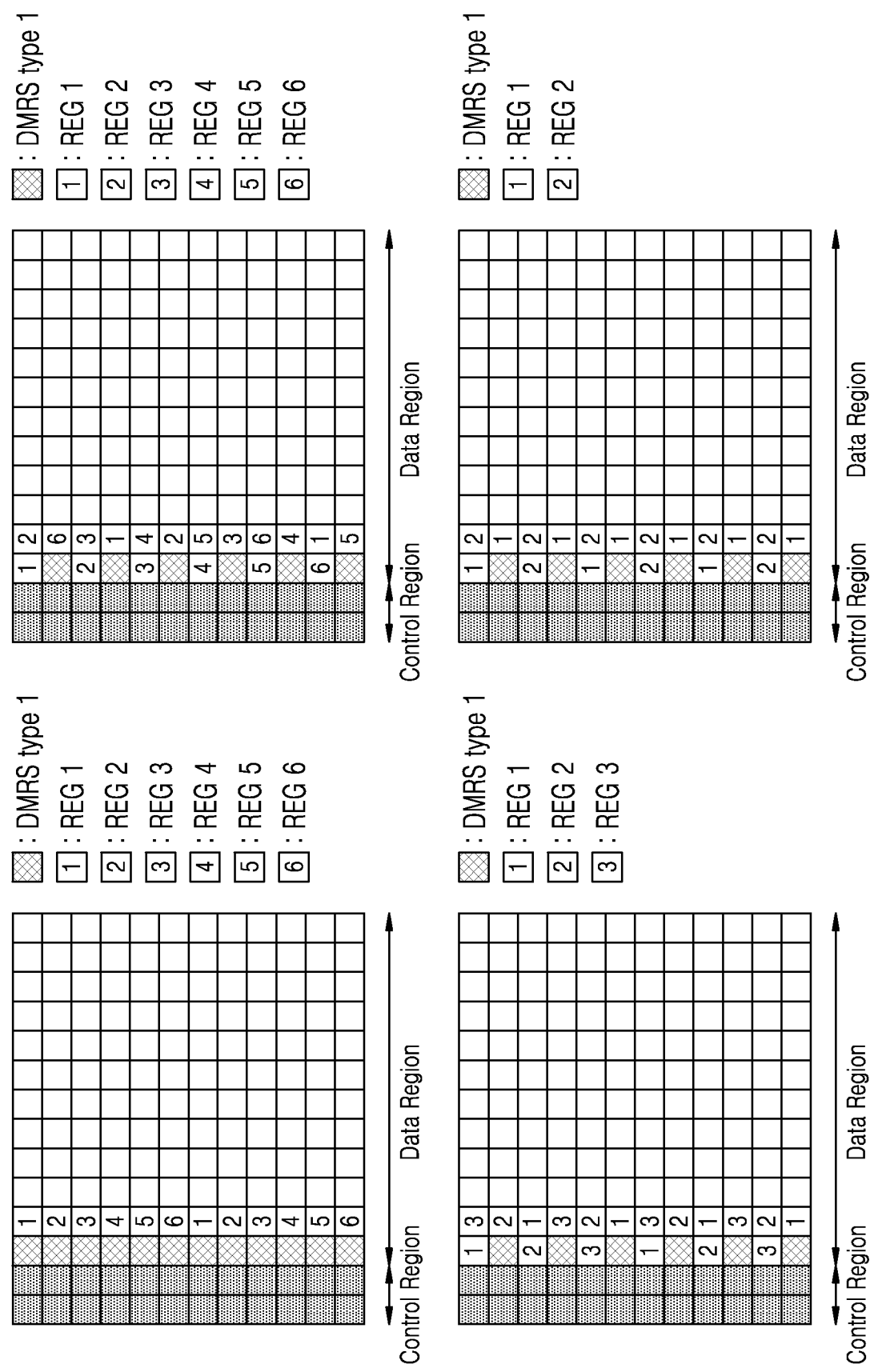
FIGS. 11 to 12 are diagrams illustrating a method of configuring a resource element group (REG) according to a group size, according to an embodiment.
Figure 12:
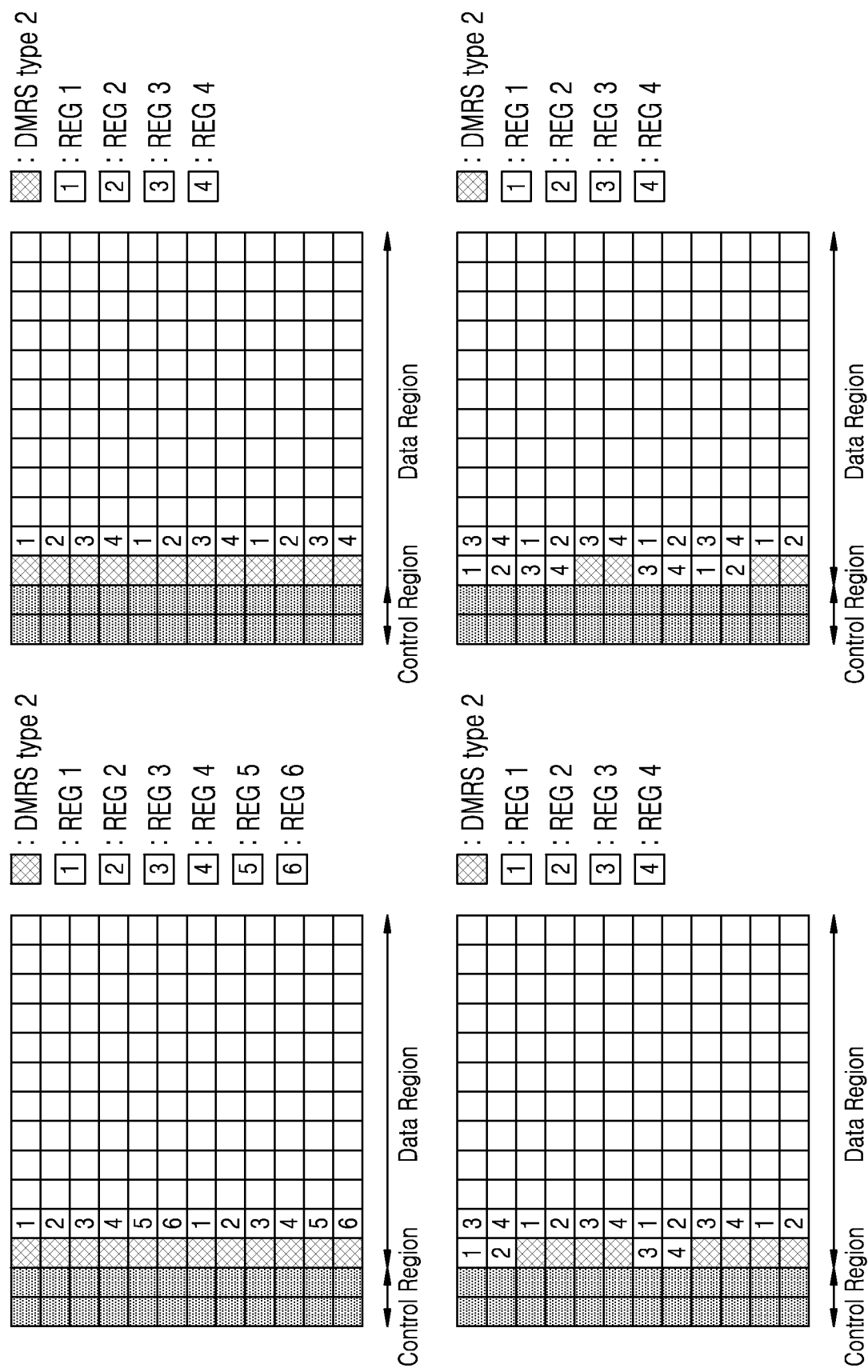
Figure 13:
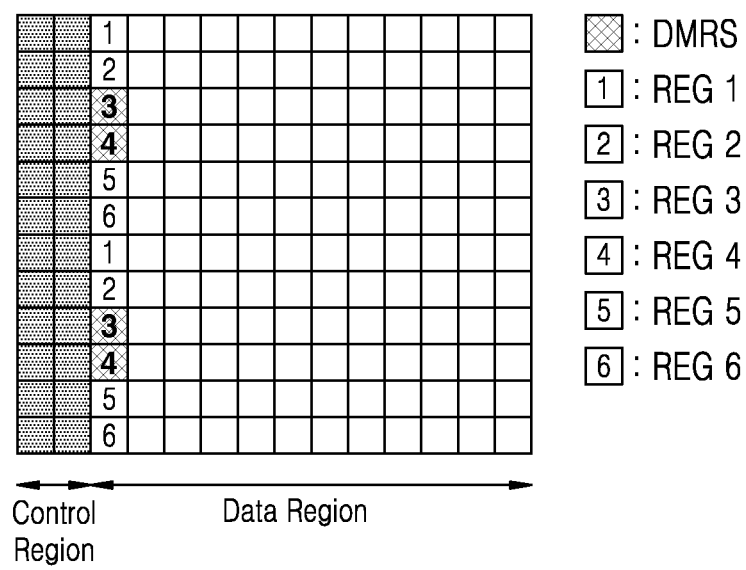
FIG. 13 is a diagram illustrating configuration of a REG related to a demodulation reference signal (DMRS), according to an embodiment.

FIG. 10 is a diagram illustrating a method of configuring adjacent REs as one group when a group size is 4. FIG. 11 illustrates a method of configuring REGs having group sizes of 2, 2, 4, and 6 when DMRS type 1 of 5G NR phase I is used. FIG. 12 illustrates a method of configuring REGs having group sizes of 2, 3, 3, and 3 when DMRS type 2 of 5G NR phase I is used. FIG. 13 illustrates a method of defining six REGs having a group size of 2, defining two REGs using DMRSs, and configuring the remaining REGs as REGs for data transmission. Methods of grouping REs proposed in the disclosure are not limited to the embodiments of FIGS. 10 to 13, and various modifications may be made therein within a range allowed by the technical spirit of the disclosure.

Figure 14:
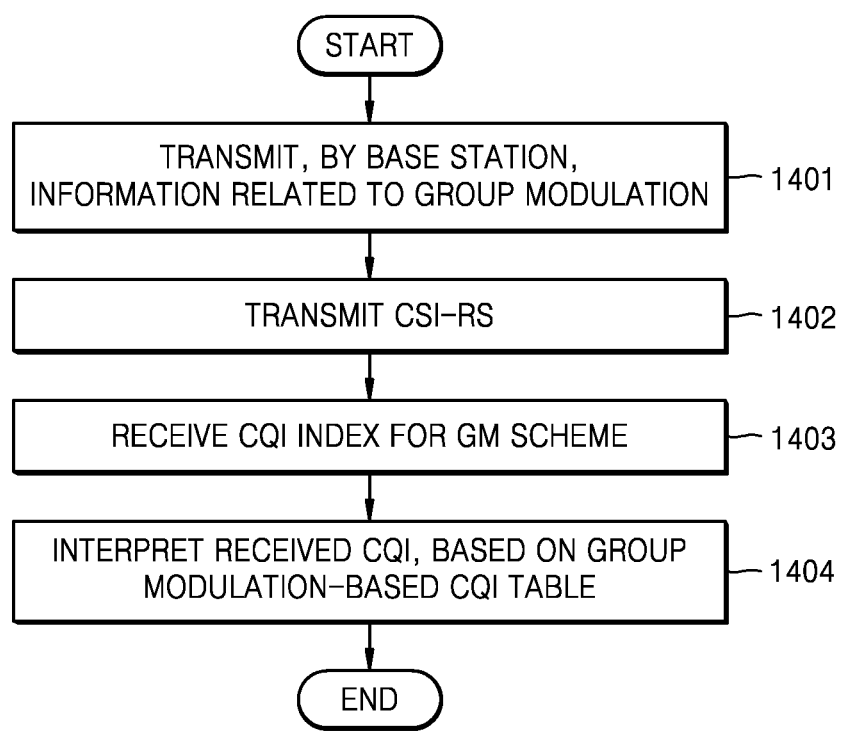
FIG. 14 is a diagram illustrating an operating method of a base station, for transmitting and receiving modulation signals, according to an embodiment.

FIG. 14 is a diagram illustrating an operating method of a base station, for transmitting or receiving a modulation signal, according to an embodiment. FIG. 14 may be an operating method of the base station for link adaptation.

In operation 1401, the base station may transmit information related to group modulation.

In operation 1402, the base station may transmit a channel state information reference signal (CSI-RS).

In operation 1403, the base station may receive a channel quality indicator for a group modulation scheme. In some embodiments, the base station may receive a CQI index.

In operation 1404, the base station may interpret the received CQI, based on a group modulation-based CQI table. When operated in the fallback mode, the base station may interpret the received CQI, based on a default CQI table instead of the group modulation-based CQI table.

Figure 15:
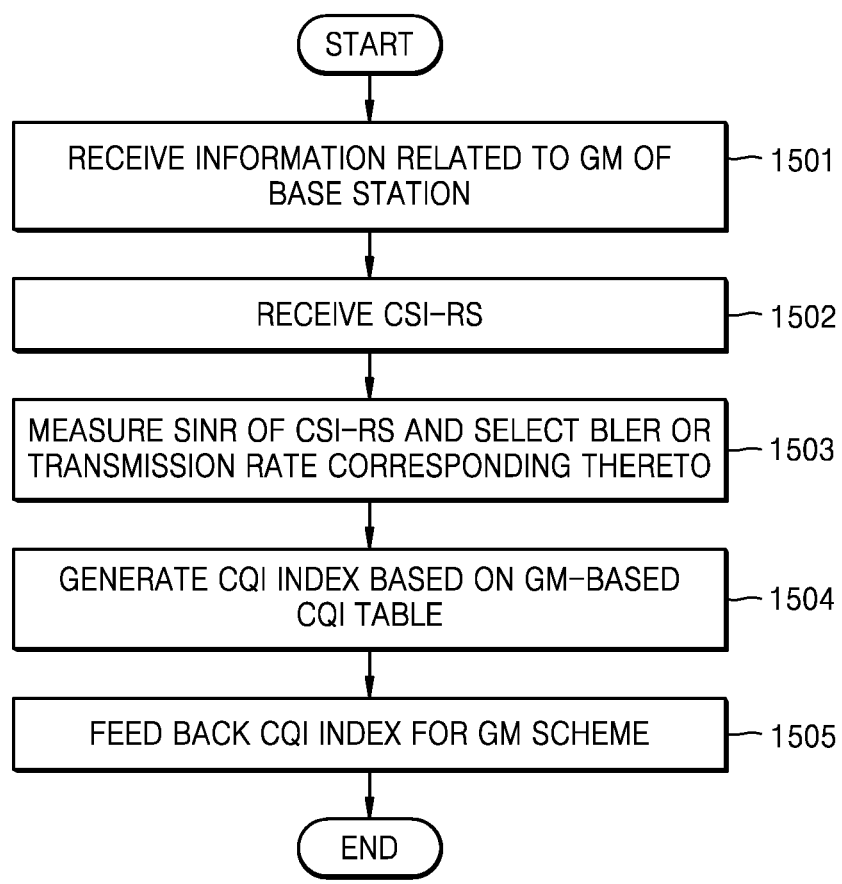
FIG. 15 is a diagram illustrating an operating method of a user equipment (UE) to transmit and receive modulation signals, according to an embodiment.

FIG. 15 is a diagram illustrating an operating method of a UE to transmit or receive a modulation signal, according to an embodiment. FIG. 15 may be an operating method of a UE for link adaptation.

In operation 1501, the UE may receive information related to group modulation of a base station.

In operation 1502, the UE may receive a channel state information reference signal (CSI-RS).

In operation 1503, the UE may measure a signal interference noise ratio (SINR) of the received CSI-RS and select a block error rate (BLER) or a transmission rate corresponding thereto.

In operation 1504, the UE may generate a CQI index based on a group modulation-based CQI table.

In operation 1505, the UE may feed back the CQI index for a group modulation scheme. When operated in the fallback mode, the UE may generated the CQI index, based on a default CQI table instead of the group modulation-based CQI table.

In some embodiments, the UE may determine a group size for group modulation according to a channel state estimation value such as the received SINR and capabilities of the UE such as battery consumption, and determine the CQI index, based on the number of bits per group and a code rate shown in a CQI table corresponding to the group size. The group modulation-based CQI table may be expressed as shown in FIG. 16. As illustrated in FIG. 16, at least one of the UE or the base station may use a CQI table for each group size or a CQI table including various group sizes. However, the group modulation-based CQI table is not limited to the example of FIG. 16. In FIG. 16, (#of bits per group) represents the number of data bits to be transmitted per group, defined in group modulation. Efficiency is calculated by a formula below.

$$(\text{efficiency}) = (\text{\#of bits per group})/(\text{group size}) \times (\text{code rate}) \quad \text{[Equation 1]}$$

A default mode CQI table may be expressed as shown in FIG. 17. The default mode CQI table may be the same as that used in the existing LTE/LTE-A or 5G NR. However, the default mode CQI table is not limited to the example of FIG. 17.

Figure 18:
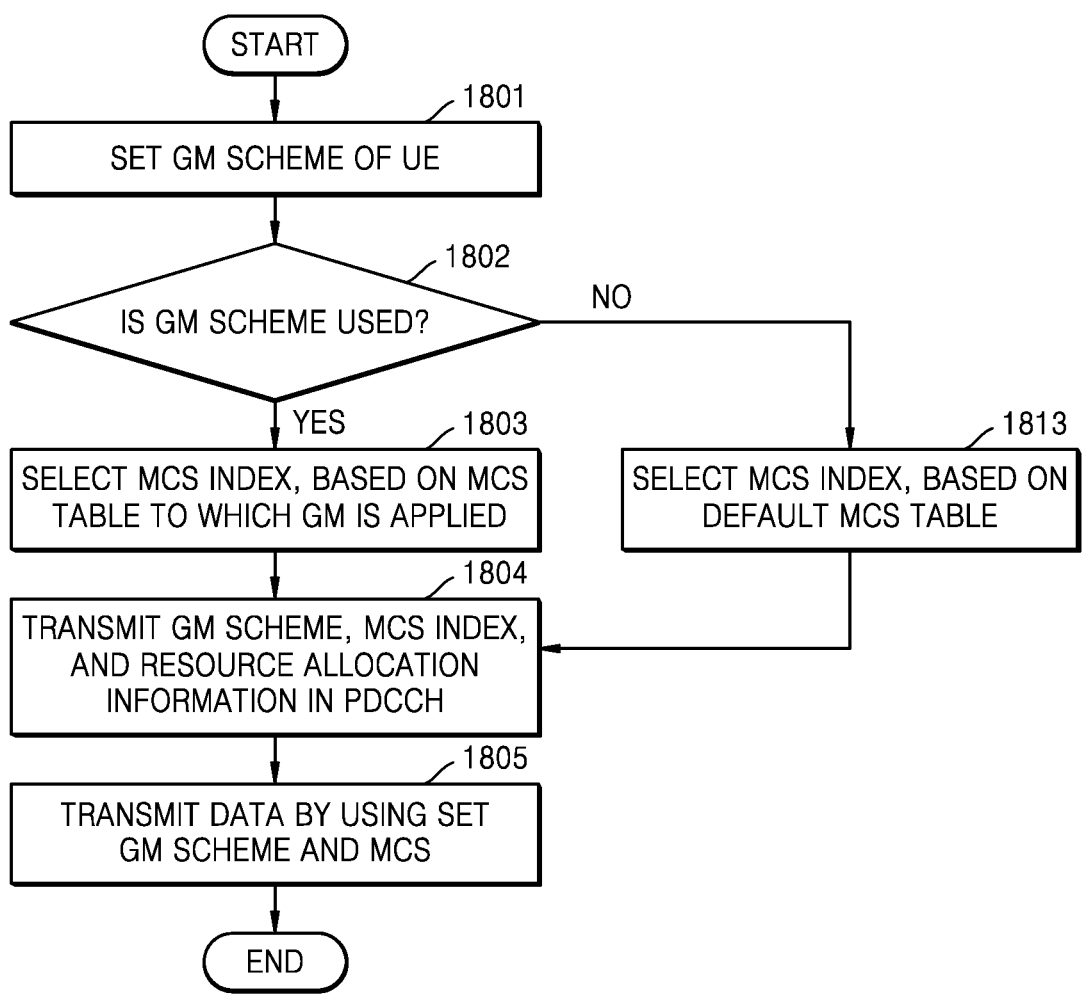
FIG. 18 is a diagram illustrating a method of configuring a modulation and coding scheme (MCS) to transmit and receive modulation signals, the method being performed by a base station, according to an embodiment.

FIG. 18 is a diagram illustrating a method of configuring an MCS to transmit or receive a modulation signal, the method being performed by a base station, according to an embodiment. The method of FIG. 18 may be a method of configuring an MCS for group modulation-based link adaptation, the method being performed by the base station.

In operation 1801, the base station may configure a group modulation scheme of a UE.

In operation 1802, the base station may determine whether the group modulation scheme is used in the UE.

In operation 1803, when the group modulation scheme is used in the UE, the base station may select an MCS index, based on an MCS table to which GM of the UE is applied.

In operation 1804, the base station may transmit at least one of information about the group modulation scheme, the MCS index, or resource allocation information by using a PDCCH.

In operation 1805, the base station may transmit data by using the configured group modulation scheme and an MCS.

In operation 1813, when the UE does not use the group modulation scheme, the base station may select an MCS index, based on a default MCS table.

Figure 19:
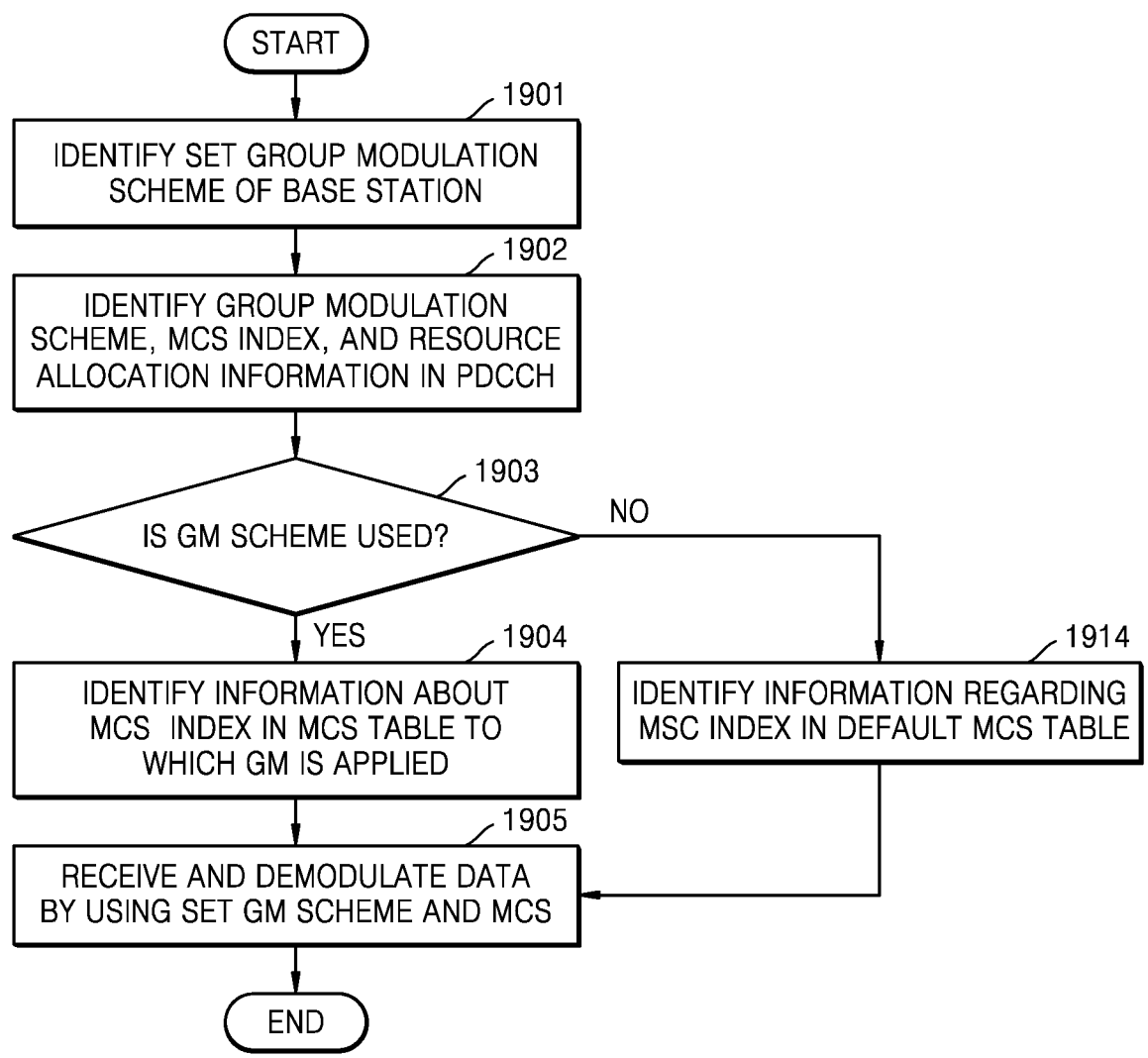
FIG. 19 is a diagram illustrating a method of configuring an MCS to transmit and receive modulation signals, the method being performed by a UE, according to an embodiment.

FIG. 19 is a diagram illustrating a method of configuring an MCS to transmit or receive a modulation signal, the method being performed by a UE, according to an embodiment.

In operation 1901, the UE may identify a configured group modulation scheme.

In operation 1902, the UE may identify the group modulation scheme, an MCS index, and resource allocation information in a PDCCH.

In operation 1903, the UE may identify whether the group modulation scheme is used.

In operation 1904, when the group modulation scheme is used, the UE may identify information about the MCS index in an MCS table to which group modulation (GM) is applied. In other words, the UE may identify the information about the MSC index, which is identified in operation 1902, in the MCS table to which the GM is applied.

In operation 1905, the UE may receive and demodulate data by using the configured group modulation scheme and an MCS.

In operation 1914, when the group modulation scheme is not used, the UE may identify information regarding the MCS index in a default MCS table.

In some embodiments, the base station may configure a group modulation scheme of the UE, based on information about the group modulation scheme and a CQI index received from the UE and allocate the MCS index and resources. FIG. 20 is a diagram illustrating an MCS table in a group modulation mode according to an embodiment. FIG. 21 is a diagram illustrating an MCS table in the default mode according to an embodiment. However, embodiments are not limited to the above examples.

As illustrated in FIG. 21, an MCS table for each group size or an MCS table including various group sizes may be used. In FIG. 20, (#of bits per group) represents the number of data bits to be transmitted per group, defined in group modulation. Efficiency is calculated by Equation 1 as in the CQI table. In some embodiments, the default mode CQI table may be the same as that used in LTE/LTE-A or 5G NR.

In some embodiments, information about whether or not group modulation is to be used may be transmitted in an RRC message when a base station and UE are connected via RRC. When group modulation is used, the UE or the base station may select a semi-static group modulation scheme or a dynamic group modulation scheme as a group modulation type. The semi-static group modulation scheme may be a method in which a group size that is initially configured during transmission of data is fixedly used. The dynamic group modulation scheme may be a method in which a group size is changed and used according to a request from a base station or a UE. A request to change a group size (or other configurations related to group modulation) of the base station, may be transmitted through existing MCS configuration information, and a request to change a group size (or other configurations related to group modulation) of the UE may be transmitted through feedback of a CQI.

In some embodiments, a fall back mode exists when data in which group modulation is used is transmitted. The fallback mode refers to a mode in which when an error occurs in a part of the system, all or some functions of the part are not operated to prevent the entire system from not operating. A mode in which the system operates normally is opposed to the fallback mode and may be defined as a normal mode. Group modulation is not supported in the fallback mode. Therefore, in this case, a default CQI/MCS index table (see FIG. 17 or 21) may be used. Conversely, in the normal mode other than the fallback mode, a group modulation-based CQI/MCS index table (see FIG. 16 or 20) is used. In some embodiments, fallback mode switching information may be included in a DCI message transmitted by using the PDCCH.

Figure 22:
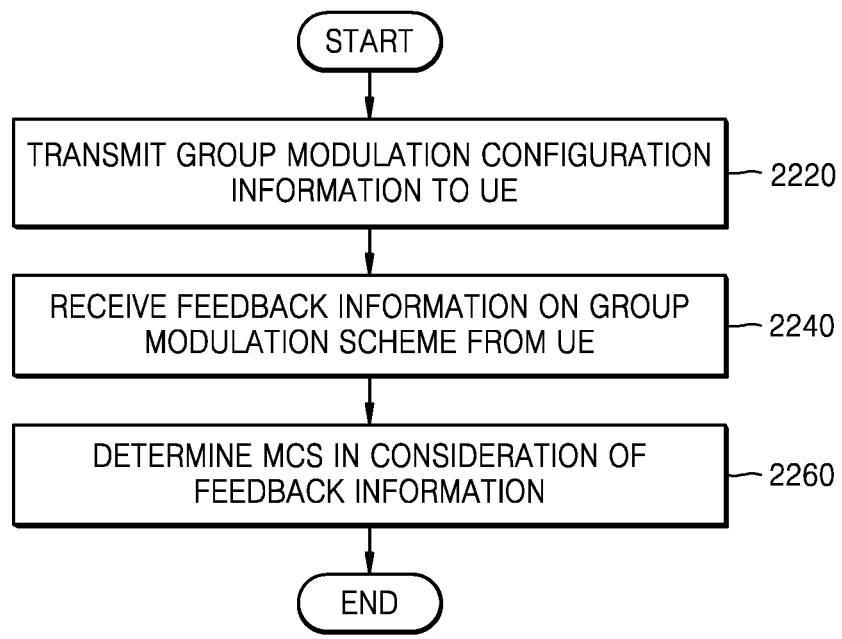
FIG. 22 is a flowchart of an operation of a base station, for transmitting and receiving modulation signals, according to an embodiment.

FIG. 22 is a flowchart of an operation of a base station, for transmitting or receiving a modulation signal, according to an embodiment.

In operation 2220, the base station may transmit group modulation configuration information to a UE. In some embodiments, the group modulation configuration information may be information about group modulation configuration of the base station.

In some embodiments, the group modulation configuration information may include at least one of information about whether a group modulation scheme is to be used in the base station, a group size available for group modulation, or the number of bits per group for group modulation. In other words, the group modulation configuration information may include at least one of information about whether the base station uses the group modulation scheme, information about a group size configurable when the base station uses the group modulation scheme, or information about the number of bits per group which is configurable when the base station uses the group modulation scheme.

In some embodiments, the base station may transmit the group modulation configuration information to the UE by at least one of higher layer signaling or radio resource control (RRC) signaling.

In some embodiments, group modulation may be configured to perform modulation by mapping at least one bit to a group modulation symbol as described above. For example, the base station or the UE may improve a BLER or a bit error rate (BER) by mapping at least one bit to a group modulation symbol including a plurality of group modulation subsymbols.

In operation 2240, the base station may receive feedback information on the group modulation scheme from the UE.

In some embodiments, the feedback information may include at least one of a channel quality indicator or channel state information. The channel quality indicator or the channel state information may include information about a channel state measured by the UE, based on a CSI-RS transmitted from the base station to the UE.

In some embodiments, the feedback information may include a CQI index. The UE may determine a corresponding CQI table, based on the information about the channel state measured based on the CSI-RS and information about capabilities of the UE, determine the CQI index from a CQI table, and transmit the CQI index through the feedback information.

For example, the UE may determine the CQI index from at least one of a CQI table in a group modulation mode of the base station or a CQI table in the default mode, based on the group modulation configuration information. As another example, the UE may determine a group size for group modulation according to a channel state estimation value such as a received SINR and capabilities of the UE such as battery consumption, and determine the CQI index, based on the number of bits per group and a code rate shown in a CQI table corresponding to the group size.

In some embodiments, the CQI index may be selected according to at least one of a group size for group modulation, which is determined based on at least one of channel state information and the information about the capabilities of the UE, the number of bits per group, or a code rate. An order or method in which the UE determines the CQI index is not limited to the above example.

In operation 2260, the base station may determine an MCS in consideration of the feedback information.

In some embodiments, the base station may determine whether the group modulation scheme is to be used in the UE, based on the feedback information, and determine an MCS to be used in the UE, based on a result of the determination.

In some embodiments, information about the MCS may include information about the group modulation scheme to be used in the UE. For example, the information about the MCS may include an MCS index.

In some embodiments, the information about the group modulation scheme may include at least one of information about whether the group modulation scheme is to be used in the UE, a group size for group modulation, the number of bits per group, or a code rate.

For example, the base station may determine the MCS index in consideration of the feedback information. However, when the base station determines the MCS index, it is not necessary to consider the feedback information from the UE. The base station may determine whether the group modulation scheme is to be used in the UE, and determine an MCS index from at least one of an MCS table in the group modulation mode or an MCS table in the default mode, based on a result of the determination.

In addition, the base station may transmit information about the determined MCS to the UE. In some embodiments, the base station may transmit the information about the determined MCS to the UE by using a PDCCH.

Figure 23:
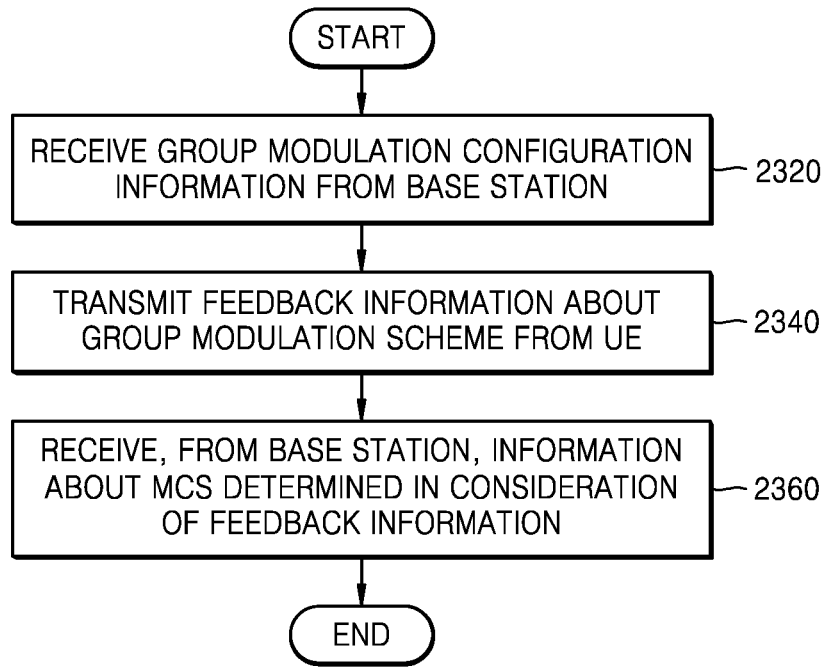
FIG. 23 is a flowchart of an operation of a UE to transmit and receive modulation signals, according to an embodiment.

FIG. 23 is a flowchart of an operation of a UE to transmit or receive a modulation signal, according to an embodiment.

In operation 2320, the UE may receive group modulation configuration information from a base station.

In some embodiments, the group modulation configuration information may include at least one of information about whether a group modulation scheme is to be used in the base station, a group size available for group modulation, or the number of bits per group for group modulation. The group modulation configuration information is as described above.

In some embodiments, the UE may receive the group modulation configuration information from the base station by at least one of higher layer signaling or RRC signaling.

In operation 2340, the UE may transmit feedback information about a group modulation scheme to the base station.

In some embodiments, the feedback information may include a CQI index. The CQI index may be selected according to at least one of a group size for group modulation which is determined based on at least one of channel state information and information about capabilities of the UE, the number of bits per group, or a code rate. The feedback information is as described above.

In operation 2360, the UE may receive information about an MCS determined in consideration of the feedback information from the base station.

In some embodiments, the MCS may be determined by the base station. Alternatively, the MCS may be determined based on whether the group modulation scheme is to be used in the UE, based on the feedback information.

In some embodiments, the information about the MCS may include information about the group modulation scheme to be used in the UE, and the information about the group modulation scheme to be used in the UE may include at least one of information about whether the group modulation scheme is to be used in the UE, a group size for group modulation, the number of bits per group, or a code rate. The information about the MCS is as described above.

In some embodiments, the UE may receive the information about the MCS from the base station by using a PDCCH.

Figure 24:
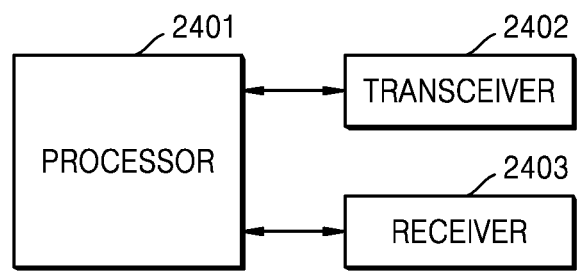
FIG. 24 is a block diagram illustrating a configuration of a base station, according to an embodiment.
Figure 25:
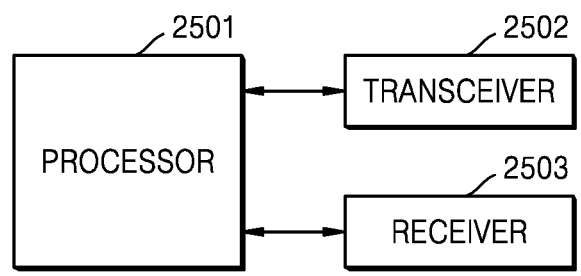
FIG. 25 is a block diagram illustrating a configuration of a UE according to an embodiment.

A transmitter, a receiver, and a controller of a base station and a transmitter, a receiver, and a controller of a UE, which are capable of implementing the embodiments of the disclosure, are illustrated in FIGS. 24 and 25. In the embodiments, the methods, which are performed by a base station and a UE, to which methods of transmitting and receiving a downlink control channel and a data channel in a communication system are applied, are described above, and a transceiver, a processor, and a memory of each of the base station and the UE should be operated according to the embodiments to perform the methods.

FIG. 24 is a block diagram illustrating a configuration of a base station according to an embodiment.

Referring to FIG. 24, a base station may include a processor 2401, a transceiver 2402, and a memory 2403. However, components of the base station are not limited thereto. For example, the UE may include more components or fewer components than the components described above. Alternatively, the processor 2401, the transceiver 2402, and the memory 2403 may be embodied as one chip.

In some embodiments, the processor 2401 may control a series of processes so that the base station may operate according to the above-described embodiments of the disclosure. For example, the processor 2401 of the base station may control allocation and transmission of a downlink control channel using an OFDM signal, an RS, data channel resource mapping, and transmission and reception methods, etc. according to the embodiments of the disclosure. The processor 2401 may include a plurality of processors, and may execute a program stored in the memory 2403 to control to: transmit group modulation configuration information to a UE, receive feedback information about a group modulation scheme from the UE, and determine an MCS in consideration of the feedback information.

The transceiver 240 may transmit signals to and receive signals from the UE. The signals transmitted to and received from the UE may include control information and data. In some embodiments, the transceiver 2402 may include a radio-frequency (RF) transmitter that up-converts and amplifies a frequency of a signal to be transmitted, an RF receiver that low-noise amplifies a received signal and down-converts a frequency of the signal, and the like. However, the above description is merely intended to provide an embodiment of the transceiver 2402, and components of the transceiver 2402 are not limited to the RF transmitter and the RF receiver. In addition, the transceiver 2402 may receive a signal through a radio channel, output the signal to the processor 2401, and transmit a signal output from the processor 2401 through the radio channel.

In some embodiments, the memory 2403 may store programs and data required for operation of the base station. In addition, the memory 2403 may store control information or data included in a signal transmitted from or received by the base station. The memory 2403 may include a storage medium such as a ROM, a RAM, a hard disc, a CD-ROM, or a DVD, or a combination thereof. The memory 2403 may include a plurality of memories. In some embodiments, the memory 2403 may store a program for transmitting or receiving a modulation signal and a program for configuring a group modulation scheme as described above and transmitting or receiving the group modulation scheme.

FIG. 25 is a block diagram illustrating a configuration of a UE according to an embodiment. Referring to FIG. 25, the UE may include a processor 2501, a transceiver 2502, and a memory 2503. However, components of the UE are not limited to the above-described examples. For example, the UE may include more components or fewer components than the components described above. Alternatively, the processor 2501, the transceiver 2502, and the memory 2503 may be embodied as one chip.

In some embodiments, the processor 2501 may control a series of processes so that the UE may operate according to the above-described embodiments of the disclosure. For example, the processor 2501 of the UE may control reception of a downlink control channel using an OFDM signal, an RS, a method of transmitting or receiving a data channel, etc. according to embodiments of the disclosure. The processor 2501 may include a plurality of processors, and may execute a program stored in the memory 2503 to control to: receive group modulation configuration information from a base station, transmit feedback information about a group modulation scheme to the base station, and receive from the base station an MCS determined in consideration of the feedback information.

In some embodiments, the transceiver 2502 may transmit signals to and receive signals from the base station. The signals transmitted to and received from the base station may include control information and data. In some embodiments, the transceiver 2502 may include an RF transmitter that up-converts and amplifies a frequency of a signal to be transmitted, an RF receiver that low-noise amplifies a received signal and down-converts a frequency of the signal, and the like. However, the above description is merely intended to provide an embodiment of the transceiver 2502, and components of the transceiver 2502 are not limited to the RF transmitter and the RF receiver. In addition, the transceiver 2502 may receive a signal through a radio channel, output the signal to the processor 2501, and transmit a signal output from the processor 2501 through the radio channel.

In some embodiments, the memory 2503 may store programs and data required for operation of the UE. In addition, the memory 2503 may store control information or data included in a signal transmitted from or received by the UE. The memory 2503 may include a storage medium such as a ROM, a RAM, a hard disc, a CD-ROM, or a DVD, or a combination thereof. The memory 2503 may include a plurality of memories. In some embodiments, the memory 2503 may store a program for transmitting or receiving a modulation signal and a program for configuring a group modulation scheme as described above and transmitting or receiving the group modulation scheme.

The methods according to the embodiments of the disclosure described in the claims or specification of the disclosure may be implemented by hardware, software, or a combination of hardware and software.

When the methods are implemented by software, a non-transitory, semi-transitory or transitory computer-readable storage medium storing one or more programs (software modules) may be provided. The one or more programs stored in the non-transitory computer-readable storage medium are configured to be executable by one or more processors included in an electronic device. The one or more programs include instructions that cause an electronic device to execute the methods according to the embodiments set forth in the claims or specification of the disclosure.

Such programs (software modules or software) may be stored in a random access memory, a non-volatile memory such as flash memory, a read-only memory (ROM), an electrically erasable programmable ROM (EEPROM), a magnetic disc storage device, a compact disc-ROM (CD- ROM), a digital versatile disc (DVD), other types of optical storage devices, or a magnetic cassette. Otherwise, such programs may be stored in a memory which is a combination of some or all the above storage media. Alternatively, a plurality of such memories may be provided.

The programs may be stored in an attachable storage device accessible via communication networks such as the Internet, an Intranet, a local area network (LAN), a wide LAN (WLAN) or a storage area network (SAN) or a combination thereof. Such a storage device may be connected to a device performing embodiments of the disclosure through an external port. Otherwise, a separate storage device in a communication network may be connected to a device that performs embodiments of the disclosure.

In the embodiments of the disclosure described above, each component included in the disclosure is expressed in a singular or plural form according to a presented embodiment. However, singular or plural expressions are appropriately selected according to a situation described for convenience of description and the disclosure is not limited by singular or plural components. Even components expressed in a plural form may be embodied in a singular form or even components expressed in a singular form may be embodied in a plural form.

The embodiments of the disclosure set forth in the present specification and drawings are merely intended to provide examples to easily explain the technical matters of the disclosure and help understanding of the disclosure, and are not intended to limit the scope of the disclosure. That is, it will be obvious to those of ordinary skill in the art that other modified examples based on the technical spirit of the disclosure may be implemented. These embodiment can be implemented in combination as necessary. For example, a base station and a UE may be operated according to a combination of part of an embodiment of the disclosure and part of another embodiment of the disclosure. In addition, embodiments of the disclosure are applicable to other communication systems and other modifications based on the technical spirit of the embodiments may also be implemented.

The invention claimed is:

1. A method performed by a base station in a wireless communication system, the method comprising:
    transmitting, to a user equipment (UE), configuration information associated with a group modulation for transmitting data by mapping a group of a plurality of resource elements (REs) to a single modulation symbol;
    receiving, from the UE, feedback information indicating a channel quality indicator (CQI) index, which is determined based on a CQI table corresponding to the group modulation;
    determining a modulation and coding scheme (MCS), based on the CQI index; and
    transmitting, to the UE, information associated with the MCS.

2. The method of claim 1, wherein the configuration information comprises:
    information about whether the group modulation is to be used in the base station;
    information indicating a group size available for the group modulation; and information about a number of bits per group available for the group modulation.

3. The method of claim 1,
    wherein the CQI index is determined, based on a group size for the group modulation, a number of bits per group and a code rate, and
    wherein the group size is determined, based on channel state information or information about capabilities of the UE.

4. The method of claim 1,
    wherein the determining of the MCS comprises:
    determining a group modulation scheme to be used in the UE, based on the CQI index; and
    determining an MCS index and resource allocation information, based on the group modulation scheme.

5. The method of claim 4, wherein the information associated with the MCS comprises:
    information about the group modulation scheme to be used in the UE;
    information indicating the MCS index; and
    the resource allocation information.

6. The method of claim 4, wherein the information associated with the MCS is transmitted via a physical downlink control channel (PDCCH).

7. The method of claim 1, wherein the configuration information is transmitted via a radio resource control (RRC) message.

8. A method performed by a user equipment (UE) in a wireless communication system, the method comprising:
    receiving, from a base station, configuration information associated with a group modulation for transmitting data by mapping a group of a plurality of resource elements (REs) to a single modulation symbol;
    transmitting, to the base station, feedback information indicating a channel quality indicator (CQI) index, which is determined based on a CQI table corresponding to the group modulation; and
    receiving, from the base station, information associated with a modulation and coding scheme (MCS) determined based on the CQI index.

9. The method of claim 8,
    wherein the CQI index is determined based on a group size for the group modulation, a number of bits per group and a code rate, and
    wherein the group size is determined based on channel state information or information about capabilities of the UE.

10. The method of claim 8, wherein the configuration information comprises:
    information about whether the group modulation is to be used in the base station;
    information indicating a group size available for the group modulation; and
    information about a number of bits per group available for the group modulation.

11. The method of claim 8, wherein a group modulation scheme to be used in the UE is determined, based on the CQI index, and
    wherein an MCS index and resource allocation information are determined, based on the group modulation scheme.

12. The method of claim 11, wherein the information associated with the MCS comprises:
    information about the group modulation scheme to be used in the UE;
    information indicating the MCS index; and
    the resource allocation information.

13. The method of claim 8, wherein information associated with the MCS is received via a physical downlink control channel (PDCCH).

14. A base station in a wireless communication system, the base station comprising:
- a transceiver; and
- at least one processor coupled to the transceiver and configured to:
- transmit, to a user equipment (UE) via the transceiver, configuration information associated with a group modulation for transmitting data by mapping a group of a plurality of resource elements (REs) to a single modulation symbol;
- receive, from the UE via the transceiver, feedback information indicating a channel quality indicator (CQI) index, which is determined based on a CQI table corresponding to the group modulation;
- determine a modulation and coding scheme (MCS), based on the CQI index; and
- transmit, to the UE via the transceiver, information associated with the MCS.

15. A user equipment (UE) in a wireless communication system, the UE comprising:
- a transceiver; and
- at least one processor coupled to the transceiver and configured to:
- receive, from a base station via the transceiver, configuration information associated with a group modulation for transmitting data by mapping a group of a plurality of resource elements (REs) to a single modulation symbol;
- transmit, to the base station via the transceiver, feedback information indicating a channel quality indicator (CQI) index, which is determined based on a CQI table corresponding to the group modulation; and
- receive, from the base station via the transceiver, information associated with a modulation and coding scheme (MCS) determined based on the CQI index.

* * * * *